(12) United States Patent
Kehoe et al.

(10) Patent No.: US 8,954,375 B2
(45) Date of Patent: Feb. 10, 2015

(54) METHOD AND SYSTEM FOR DEVELOPING DATA INTEGRATION APPLICATIONS WITH REUSABLE SEMANTIC TYPES TO REPRESENT AND PROCESS APPLICATION DATA

(75) Inventors: William V. Kehoe, Allston, MA (US);
Jerry L. Callen, Cambridge, MA (US);
Steven R. Frechette, Reading, MA (US)

(73) Assignee: QlikTech International AB, Lund (SE)

( * ) Notice: Subject to any disclaimer, the term of this patent is extended or adjusted under 35 U.S.C. 154(b) by 235 days.

(21) Appl. No.: 13/272,863

(22) Filed: Oct. 13, 2011

(65) Prior Publication Data

US 2012/0095973 A1   Apr. 19, 2012

Related U.S. Application Data

(60) Provisional application No. 61/393,639, filed on Oct. 15, 2010.

(51) Int. Cl.
*G06F 9/44* (2006.01)

(52) U.S. Cl.
CPC ........................................ *G06F 8/70* (2013.01)
USPC .... 707/602; 707/806; 707/809; 707/E17.006; 709/203; 705/7.12; 705/7.37; 705/348

(58) Field of Classification Search
CPC .............. G06Q 10/10; G06F 17/30011; G06F 17/30067; G06F 17/30286; G06F 21/6227; G06F 17/2785; G06F 8/315; G06F 8/20; G06F 17/30569; G06F 17/274; G06F 17/30557; G06F 17/2211

USPC ......... 707/600, 602, 601, 806, 810, 809, 944, 707/694, E17.006; 709/203; 705/7.12, 348, 705/7.37

See application file for complete search history.

(56) References Cited

U.S. PATENT DOCUMENTS

| | | | |
|---|---|---|---|
| 8,140,596 B2 * | 3/2012 | Brown et al. .................. | 707/810 |
| 8,176,470 B2 * | 5/2012 | Klumpp et al. ............... | 717/109 |
| 8,286,146 B2 * | 10/2012 | Richmond ..................... | 717/137 |
| 8,386,597 B2 * | 2/2013 | Fulgham et al. .............. | 709/224 |
| 2002/0184401 A1 * | 12/2002 | Kadel et al. ................... | 709/315 |
| 2002/0188616 A1 * | 12/2002 | Chinnici et al. .............. | 707/102 |
| 2003/0018832 A1 * | 1/2003 | Amirisetty et al. ........... | 709/328 |
| 2003/0233365 A1 * | 12/2003 | Schmit et al. ................. | 707/100 |
| 2004/0128300 A1 | 7/2004 | Fong et al. | |

(Continued)

OTHER PUBLICATIONS

J Blythe, D Kapoor, CA Knoblock, K Lerman, S Minton—J. UCS, 2008—jucs.org—Information Integration for the Masses—Journal of Universal Computer Science, vol. 14, No. 11 (2008) pp. 1811-1837.*

(Continued)

*Primary Examiner* — Anh Ly
(74) *Attorney, Agent, or Firm* — Ballard Spahr LLP

(57) ABSTRACT

A method and system for developing data integration applications with reusable semantic types to represent and process application data. Methods include creating schemas to describe external data, creating semantic types to describe internal data, mapping schemas to semantic types, developing dataflows that configure input and output operations using schemas, mappings, and semantic types and all other transformation operations and functions based solely on semantic types, and executing dataflows defined in this manner.

4 Claims, 25 Drawing Sheets

(56) References Cited

U.S. PATENT DOCUMENTS

| | | | |
|---|---|---|---|
| 2004/0260700 A1* | 12/2004 | Wang et al. | 707/10 |
| 2005/0234969 A1* | 10/2005 | Mamou et al. | 707/102 |
| 2005/0240592 A1* | 10/2005 | Mamou et al. | 707/9 |
| 2005/0246262 A1* | 11/2005 | Aggarwal et al. | 705/37 |
| 2005/0246353 A1 | 11/2005 | Ezer et al. | |
| 2005/0278139 A1* | 12/2005 | Glaenzer et al. | 702/179 |
| 2006/0069717 A1* | 3/2006 | Mamou et al. | 709/203 |
| 2007/0088756 A1 | 4/2007 | Bruun | |
| 2008/0071807 A1* | 3/2008 | Pappu et al. | 707/100 |
| 2008/0091720 A1* | 4/2008 | Klumpp et al. | 707/104.1 |
| 2008/0235260 A1* | 9/2008 | Han et al. | 707/102 |
| 2008/0275907 A1* | 11/2008 | Han et al. | 707/102 |
| 2008/0281626 A1* | 11/2008 | Aggarwal et al. | 705/1 |
| 2009/0259612 A1* | 10/2009 | Hanson | 706/47 |
| 2009/0282042 A1* | 11/2009 | Russell et al. | 707/8 |
| 2009/0282058 A1* | 11/2009 | Russell | 707/100 |
| 2009/0282066 A1* | 11/2009 | Russell et al. | 707/101 |
| 2009/0319544 A1* | 12/2009 | Griffin et al. | 707/100 |
| 2010/0174754 A1* | 7/2010 | B'Far et al. | 707/794 |
| 2010/0211580 A1 | 8/2010 | Sreekanth | |
| 2010/0250559 A1* | 9/2010 | Glaenzer et al. | 707/749 |
| 2011/0093514 A1* | 4/2011 | Brown et al. | 707/810 |

OTHER PUBLICATIONS

Yan Yalan; Zhang Jinlong and Yan Mi—"Semantic Web Services Enabled Dynamic Creation of Supply Chain"—Published in: Service Systems and Service Management, 2006 International Conference on (vol. 2 ) Date of Conference: Oct. 25-27, 2006 pp. 1593-1597.*
International Search Report issued for PCT/US2011/156099, dated Mar. 8, 2012 (2 pages).

* cited by examiner

METHOD AND SYSTEM FOR DEVELOPING DATA INTEGRATION APPLICATIONS WITH REUSABLE SEMANTIC TYPES TO REPRESENT AND PROCESS APPLICATION DATA

CROSS-REFERENCE TO RELATED APPLICATIONS

This application claims the benefit under 35 U.S.C. §119 (e) of the following application, the contents of which are incorporated by reference herein:

U.S. Provisional Application No. 61/393,639, entitled Method and System for Developing Data Integration Applications with Reusable Semantic Types to Represent and Process Application Data, filed on Oct. 15, 2010.

BACKGROUND

1. Field of the Invention

The present invention relates to data integration applications and, more specifically, to the use of a common type-based data abstraction layer when building data integration applications.

2. Discussion of Related Art

When a database system is upgraded or replaced, the existing data must be transferred to the new system. This process, called data migration, is traditionally expensive as database systems become larger, more diverse, and more complex. Planning and executing a data migration application consumes valuable resources and can often result in considerable downtime. Also, mistakes in data migration can lead to data corruption, which is not an acceptable risk for institutions that handle sensitive data.

These difficulties are compounded when it is necessary to combine and transform data from several different data storage systems, a process known as data integration. Data integration applications must reconcile data from several potentially incompatible storage systems, convert these data into a unified format, and load the new data into the target storage system. These are complicated tasks, and they require careful planning and detailed knowledge of the structure of the source and target databases. Errors in data integration are common, difficult to diagnose, and expensive to fix.

Traditional approaches to data integration suffer from several problems related to the business logic and mappings that are embedded in the applications. In order to effectively enforce business policies and ensure that the applications conform to an organization's standards, data integration developers must hard-code business logic, or rules, in the data integration applications to implement the standards. Embedded business logic is problematic in that the traditional business users or data governance experts responsible for the standards are wholly dependent on more technical users to implement the rules in the data applications.

This approach is also problematic because it is difficult for an organization's stakeholders to have visibility into the embedded logic of the applications as needed to either support the process of developing the applications but, more importantly, to support audit requirements. This is because such business logic is implemented in some form of transformation module or language that is not defined or managed as a declarative and reportable metadata structure of the application.

Further, implementation of the data rules as embedded logic makes it difficult for the applications to be easily reused with different source and target data systems. This is because the rules are usually performing some form of type conversion, validations, and transformations specific to the sources and targets integrated by the original application. While it is possible to reuse those parts of the application that do not implement such rules, it is not possible to do this without creating a new modified copy of the data integration application. Also, applications created using conventional data integration tools do not reliably separate the source- and target-independent logic from the logic that is source- and target-specific, making it difficult to isolate the portions of the application that can be reused without modification.

In light of these problems, there exists a need for an improved method of developing database applications that minimizes the costs and risks associated with data migration and data integration.

SUMMARY OF THE INVENTION

This invention provides methods and systems for developing data integration applications with a reusable data abstraction layer of semantic types to define the standard rules for processing an organization's business data regardless of where and how it is stored.

The methods and systems described herein may be used to create data integration applications using various processing models and deployment models. For example, the techniques disclosed herein may be used to create conventional batch applications, low-latency or real-time applications, service-oriented or so called "SaaS" applications, and applications that use alternative or hybrid processing and deployment models.

The methods and systems described herein may be used to create data integration applications that extract data from and output data to any type of data source. For example, the data source/destination may include conventional database systems, computer filesystems, streaming/realtime data, and any other medium or combination of media able to store or transmit data.

In some embodiments, the methods and systems include receiving a set of physical data identifiers that specify fields of physical data sources, storing in a database a set of semantic names for use in defining data integration applications, defining, in terms of the received semantic names, a data integration application comprising functional rules to extract, transform, and store data, and executing these rules by replacing each of the semantic names with data from the specified field of the physical data source.

In some embodiments, the methods and systems include providing a set of suggested semantic names and associating one or more of the suggested semantic names with a field of a physical data source/data type.

In some embodiments, the methods and systems include defining semantic types to uniformly represent the standard data types, constraints, validations, formatting rules, and other business logic for each atomic and composite item of data that will be processed in a data integration application, and storing the semantic types as metadata structures that may be used and reused during the process of developing one or more related or unrelated data integration applications.

In some embodiments, the methods and systems include receiving schemas that describe the data structures and types for data received from/output to various data sources, creating semantic types as previously defined to uniformly represent the data described by the schemas, associating existing semantic types that already uniformly represent the data described by the schemas, creating mapping specifications for converting data between its external form as described by the schema and its internal form as described by the semantic type, and storing the schemas, semantic types, and mappings as metadata structures that may be used and reused during the process of developing one or more related or unrelated data integration applications.

In some embodiments, the methods and systems include defining a data integration application comprising functional operators to extract, transform, and load data, whereby each input and output operator is configured to specify a physical schema that defines the physical data being read or written, the composite semantic type that defines the standardized semantic model of the data being processed, and a set of mapping rules that define the conversion from the physical data to the semantic data on the input operators and from the semantic data to the physical data on the output operators, and whereby each transform operator between the input and output operators is configured to manipulate data only according to the semantic model.

In some embodiments, the methods and systems include automatically converting the input data values from the external data type and format defined by the schema to an internal data type and format as defined by the mappings between the schema and the semantic type, and automatically converting the output data values from the internal data type and format specified by the semantic type to the external data type and format defined by the schema as defined by the mappings between the schema and the semantic type.

In some embodiments, the methods and systems include applying additional optional constraints, validations, and conversions when reading external data into the application as a data value represented by a semantic type, and when writing internal data represented as a semantic type to an external data source as defined by the semantic type and mappings from schema to the semantic type.

In some embodiments, the methods and systems include associating functions for performing data integration and ETL operations specific to the data of the semantic type such as, but not limited to, transformation rules, data cleansing rules, data profiling rules, and other rules or operations as may enhance the semantic definition of the semantic type, and that such functions may be used in an application relevant to data defined by the semantic type.

DETAILED DESCRIPTION

I. Introduction

Figure 1:
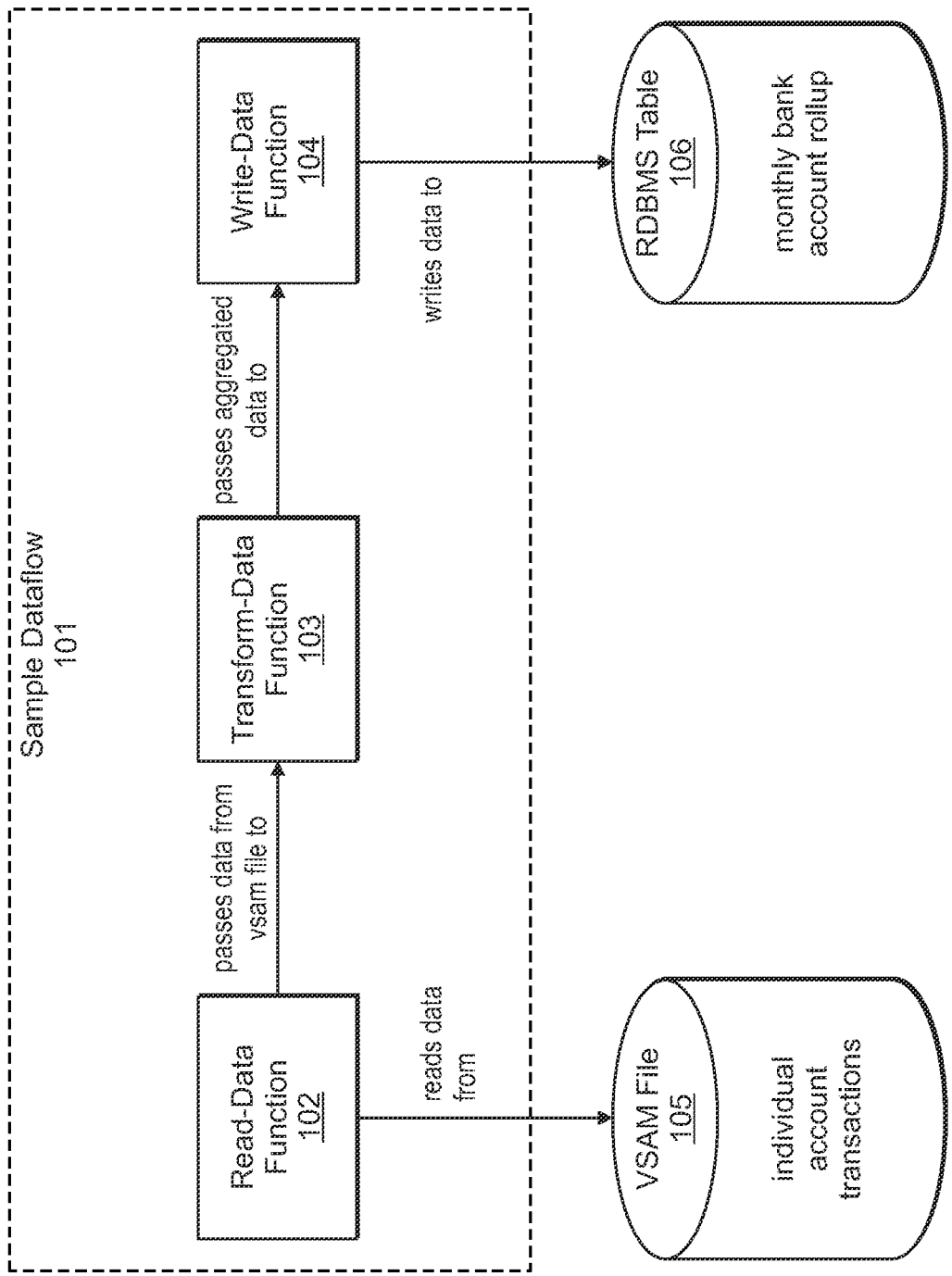
FIG. 1 is a dataflow diagram that illustrates the operation of an example application, according to certain embodiments of the invention.

Preferred embodiments of the present invention provide semantic systems and methods for developing, deploying, running, maintaining, and analyzing data integration applications and environments.

Those data integration applications that are relevant to the techniques described herein are broadly described by the class of applications concerned with the movement and transformation of data between systems and commonly represented by, but not limited to: data warehousing or ETL (extract-transform-load) applications, data profiling and data quality applications, and data migration applications that are concerned with moving data from old to new systems.

Data integration applications developed and maintained using these techniques are developed using a semantic model. A semantic development model enables a significant portion of an application to be developed without knowledge of the identities and types of the physical data being integrated. The parts of the application that can remain incomplete during this process are the parts of the application directly responsible for identifying the actual physical data structures. At some point before the application is executed, the physical data are specified and bindings from the physical model to the semantic model are specified. However, because the rest of the application that performs transformations and manipulations of the data was developed on the semantic model, which provides an abstraction of the physical model, that part of the application remains unchanged and unaffected by these physical bindings.

There are several advantages to this approach: changes to physical data locations or structures do not automatically prevent the application developer from accomplishing real work; a high or intimate level of knowledge of the data being integrated is not required; business rules and other application logic developed using a semantic model can easily be reused and tested from application to application regardless of the physicality of the underlying data structures; the costs of data mapping exercises can be significantly reduced over time as the system learns about fields that are semantically equivalent, and applications may be easily reused for different sources and targets simply by creating new data mappings from the physical model to the semantic model.

A data integration application developed using the techniques described herein is preferably stored in a common repository such as may be implemented with a database or source control system. This repository includes a semantic metadata model that correlates the schemas of the source and target data as defined by the data type schemas with corresponding semantic types, whose purpose is to abstract the physical data. The database also includes representations of business rules that are governed by the semantic model instead of the physical schema model. The business rules and the semantic model are stored and maintained separately. Thus, application developers do not need to know the physical identities and data types of the source and target data in order to implement data transformation functions.

The repository is preferably implemented using standard techniques for the persistence of shared artifacts and objects such as a source control system, a database, or standard peer-to-peer file-sharing. One described herein is a hybrid versioning system for data integration projects. This system provides version control for project artifacts, and also provides a fine-grained locking mechanism that controls the ability to edit and execute a project in various ways according to the project's current stage in the development process. The hybrid versioning system also interfaces with a relational database, which can be used to efficiently calculate and report project metrics.

In some embodiments, the system's data integration engine executes data integration applications using a parallel, distributed architecture. Parallelism is achieved where possible by leveraging multiple redundant data sources and distributing the execution of the application across multiple hosts. The techniques disclosed herein are scalable to execution environments that comprise a large number of hosts.

Figure 16:
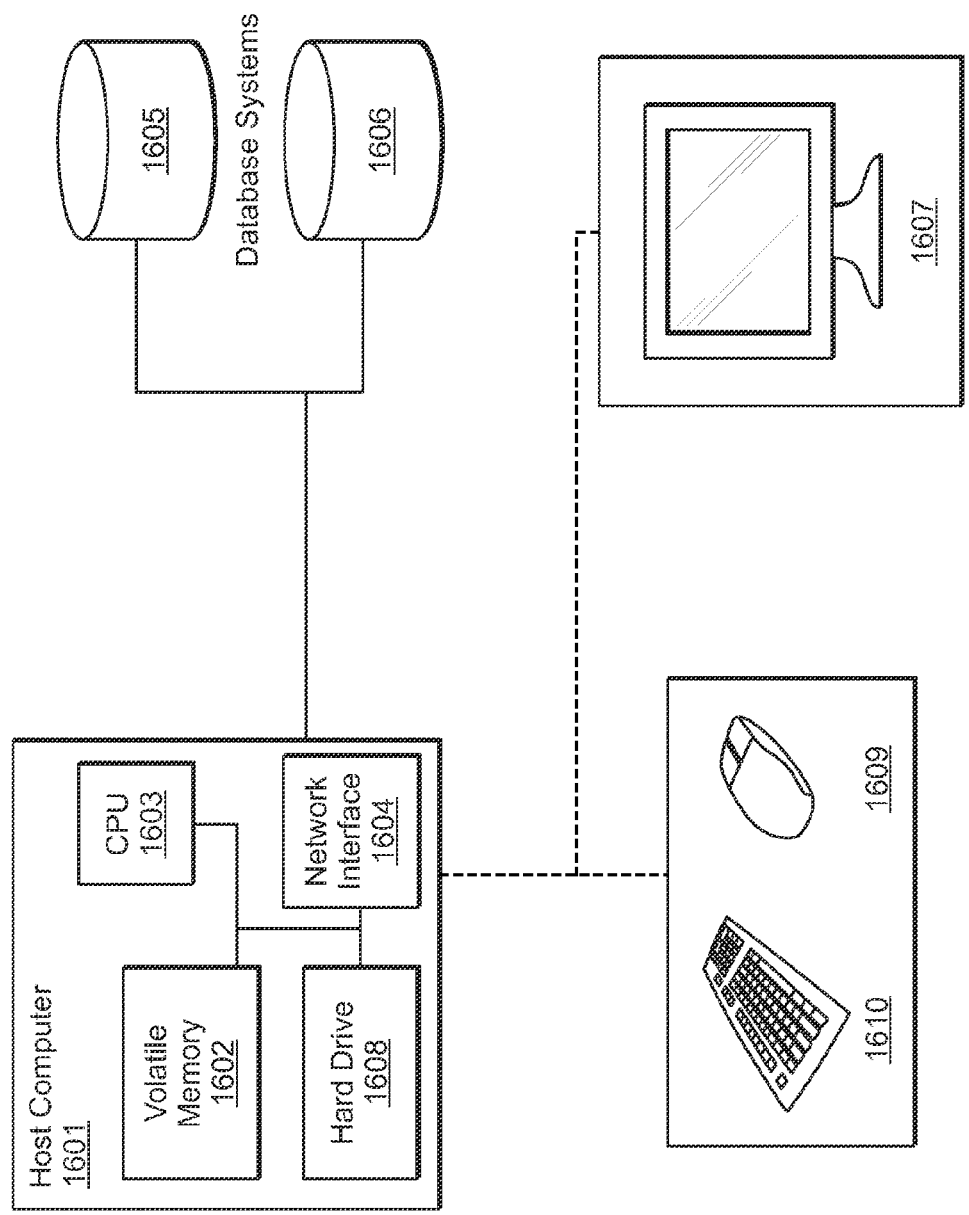
FIG. 16 is a diagram that depicts various components of a computer system and environment where a data integration system would be used, according to certain embodiments of the invention.

FIG. 16 is a diagram that depicts the various components of a data integration system, according to certain embodiments of the invention. The functional logic of the data integration is performed by a host computer 1601, that contains volatile memory 1602, a persistent storage device such as a hard drive 1608, a processor 1603, and a network interface 1604. Using the network interface, the computer can interact with databases 1605 and 1606. During the execution of the data integration application, the computer extracts data from some of these databases, transforms it according to programmatic data transformation rules, and loads the transformed data into other databases. Though FIG. 16 illustrates a system in which the computer is separate from the various databases, some or all of the databases may be housed within the host computer, eliminating the need for a network interface. The data transformation rules may be executed on a single host, as shown in FIG. 16, or they may be distributed across multiple hosts.

The host computer shown in FIG. 16 may also serve as a development workstation. Development workstations are preferably connected to a graphical display device 1607, and to input devices such as a mouse 1609, and a keyboard 1610. One preferred embodiment of the present invention includes a graphical development environment that displays a data integration application as a diagram, in which the data transformation operations are represented by shapes and the flow of data between rules is represented by arrows. This visual interface allows developers to create and manipulate data integration applications at a more intuitive level than, for example, a text-based interface. However, the techniques described herein may also be applied to non-graphical development environments.

The details of this model and system are specified in more detail in the following sections.

I. Project Model

FIG. 1 is a dataflow diagram that illustrates the operation of an example data integration application that will be referenced in following sections. An application organizes the execution of a set of functions, which perform individual units of work, and the flow of data between those functions. The sample application 101 has three functions, represented by boxes, and data flow between those functions, represented by arrows.

In this example, the Read-Data function 102 reads monthly transactional bank account data from a VSAM file 105 and outputs that data for use as input in the next function. The Transform-Data function 103 receives its input from the Read-Data function. Its transformation logic aggregates those bank account transactions to compute end-of-month status for each account, and outputs the end-of-month status for use as input to the next function. Finally, the Write-Data function 104 receives the end-of-month status from the Transform-Data function and writes that data to a flat RDBMS table 106 which will be used to produce monthly snapshot reports for each bank account.

Development of the sample application 101 begins when a project is created for managing the application's development and deployment. Also, a semantic model, separate from the project, is used to store and maintain the association between physical identities (i.e. the physical locations and data types of the project's source data) and semantic identities. If no semantic models have been created for the relevant data, a new semantic model is initialized. If a semantic model for the project's source data had already been created (e.g. by a prior project, or through ongoing maintenance) then the new project may use the existing semantic model; thus, it is not necessary to create a new semantic model for each new project.

After the creation of the project, project-specific artifacts may be created. These artifacts, discussed in more detail below, are tested and checked-in to the repository. The project entity also contains an identifier that represents the current stage of project development. At each stage of the project the application is executed by the data integration engine in a stage-specific environment. Eventually the application is considered complete and the project, and all applications contained within the project, is moved into production.

Figure 2:
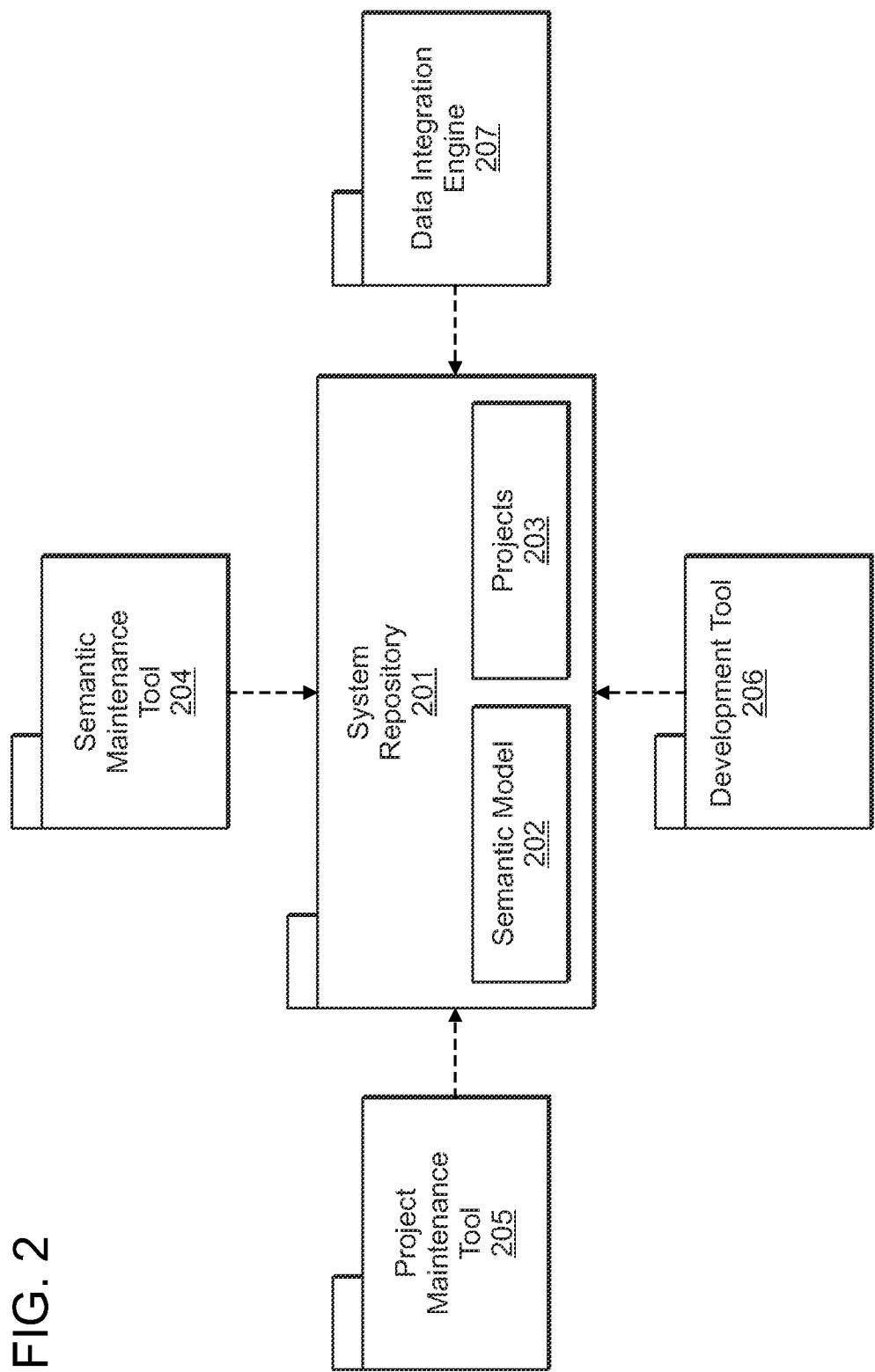
FIG. 2 is a UML package diagram that depicts the coarse dependencies and relationships among basic components of a semantic data integration system, according to certain embodiments of the invention.

FIG. 2 is a UML package diagram that depicts the coarse dependencies and relationships among the basic components of the semantic data integration system, according to certain embodiments of the invention. The system repository 201 is a database used by the system's tools and engine. It is centrally deployed in order to capture and share system objects across applications, and to provide visibility into data integration projects, data usage, application performance, and various metrics. The repository consists of three high-level subsystems: a relational database, a source control system, and business logic to implement functionality such as creating a project, publishing, staging, etc. The database and source control subsystems are provided using conventional third party technologies. The business logic is implemented with a J2EE application but could easily be .NET or some other web-application technology. The various system tools (semantic maintenance tool 204, project maintenance tool 205, and development tool 206) connect to these repository subsystems directly as required.

The primary contents of the repository include: the semantic model 202 which captures metadata that describes the contextual or semantic identities in an enterprise, the actual or physical identities in an enterprise, and various relationships between the semantic identities and physical identities, and projects 203, which are system objects that group related artifacts necessary for defining and deploying a data integration application.

The repository is manipulated by system tools including: the semantic maintenance tool 204, which maintains the semantic model, the project maintenance tool 205, which maintains projects and associated data and generates reports to various levels of detail across the system, the development tool 206 which is used to develop data integration applications, and the integration engine 207, which executes applications using a parallel, distributed system, computes runtime statistics, and stores these statistics in the repository. Additional description of these components and how they interact is included below.

Figure 3:
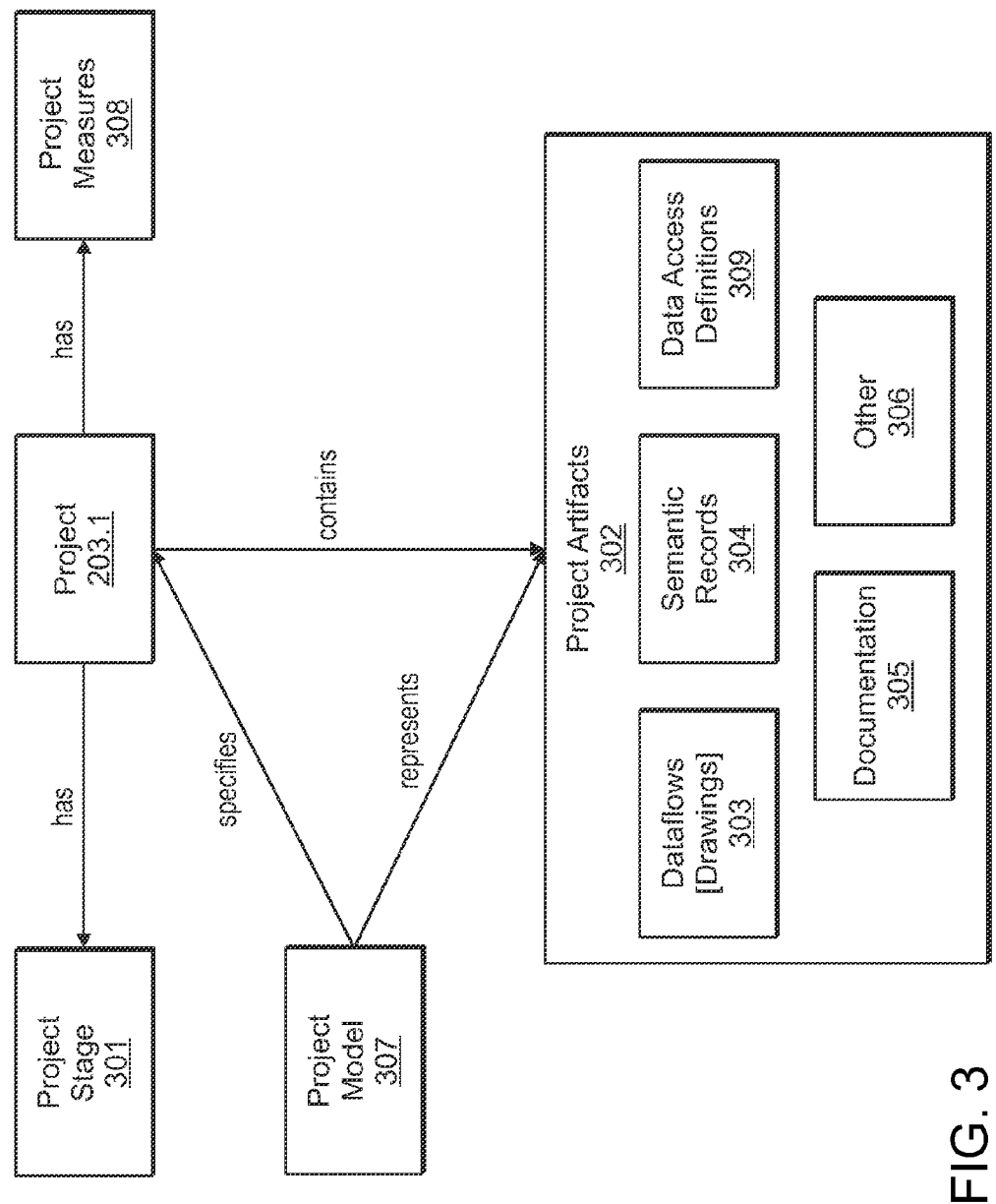
FIG. 3 is a relationship diagram that illustrates the relationships among the various types of project objects stored in the repository, according to certain embodiments of the invention.

FIG. 3 is a relationship diagram that illustrates the relationships among the various types of project objects stored in the repository, according to certain embodiments of the invention. A relationship diagram is a modified UML class diagram that conveys the relationships between objects or components. The object or component is labeled in a rectangular box and a relationship to another object or component is represented with a labeled arrow from one box to the other. The relationship reads from arrow begin to arrow end (the end of the line with the actual arrow). Like UML class diagrams, these relationship diagrams allow for containment to be expressed with an arrow or by placing the child object visually within the parent object. In some cases the rectangle for an object or component is dashed, indicating that it is not an actual object but it is really a conceptual group (like an abstract class) for the objects shown therein.

Project 203.1 is one of the projects stored in system repository 201. A project is a system object that is used to organize and manage the development and deployment of data integration applications through various stages. A project's stage 301 specifies the current state of the project within the development and deployment process. The various stages that may be associated with a project are described in more detail below. A project's measures 308 include metrics or statistics, relevant to the project, that are collected after the project is created.

A project's artifacts 302 define the project's applications and supporting metadata. These are preferably captured as XML files that are versioned using the standard source control functionality implemented by the development tool. Project artifacts are accumulated after inception and include: dataflows 303, which are visual descriptions of the functions, transformations, and data flow for one or more applications; data access definitions 309, which individually describe a set of parallel access paths (expressed as URIs) to physical data resources; semantic records 304, which primarily describe the data structures for one or more applications; documentation 305, for the project and its artifacts; and other artifacts 306 that may be created during the life of the project.

Project model 307 is a relational model that represents the project, its artifacts, and other data and metadata for the project. The project model and project measures provide a basis for introspection and analysis across all projects in the system.

A project's stage also controls where the project can be run. In an environment where this system is deployed, individual machines where the engine can run are designated to allow execution only for a specific stage. For example, host machine SYSTEST288 may be designated as a system testing machine. Any instance of the system's engine that is deployed on SYSTEST288 will only allow projects in the "system testing" stage 301.2 to run. This additional level of control is compatible with how IT departments prefer to isolate business processes by hardware.

For example, simple application 101 described above might be developed as part of a new project implemented by the IT department of a financial institution that wishes to gather and analyze additional monthly status for individual bank accounts. Project 203.1 would be created by a project manager using project maintenance tool 205 and the project would begin in the development stage 301.1 (described below). Preliminary project artifacts 302 such as semantic records 304 (described below) would then be defined and added to the project by a data architect or equivalent. A developer would then use these artifacts to create dataflows 303, which define the transformation logic of the application 101. As the application is developed and tested, the project would move through various stages (see FIG. 4) until it is finally placed into production. Project measures 308 would allow the project manager and others to analyze the project using relational reporting and analysis techniques in order to improve the company's data integration and business processes.

Development tool 206 is conventional, and similar in layout and purpose to many other existing graphical programming tools that may be used for defining workflow, process flow, or data integrations. Examples of such tools include Microsoft BizTalk Orchestrator, Vignette Business Integration Studio, and FileNet Process Designer, among others. The primary workspace consists of a palette of symbols corresponding to various functions that may be performed by engine 207, and a canvas area for creating a dataflow. Prior to creating dataflows for a project, the user is given permission to work on that project by another user of project maintenance tool 205, typically a project manager. These permissions are stored in repository 201.

From within the development tool, which is installed on the local computer of the developer using the tool, the developer is allowed to "check out" a snapshot of the artifacts for any project for which the user has permission (as defined in the repository). The project artifacts include any semantic records 305 and data access configurations 309 that the developer will need to build the dataflow; these requisite artifacts were previously defined by another user, typically a data architect, of project maintenance tool 205.

Within the development tool, the user creates a dataflow. Using our sample application for descriptive purposes, this process may work like this:

After project checkout (defined above), the user drags functions from the palette to the canvas area. In the case of our sample application, the user would drag 3 different functions from the palette: one to read data from a file (necessary for Read-Data function 101), one to transform data (necessary for Transform-Data function 102), and one to write data to a table (necessary for the Write-Data function 103). The user would then visually "connect" the functions in the dataflow according to the direction of the data flow for the sample application. Each function has properties that must be configured to define its specific behavior for the engine.

The user will then edit these properties with standard property editor user interfaces. The properties specified by the user for the Read-Data function include the name of its output semantic record 305.2 which specifies the data being read from the file, and the name of a data access configuration 309 which specifies one or more parallel access paths (expressed as URIs) to the file. The properties specified by the user for the Write-Data function include the name of its input semantic record 305.1 which specifies the data being written to the table, and the name of a data access definition 309 which specifies one or more parallel access paths (expressed as URIs) to the table.

Because the user connected the Read-Data function to the Transform-Data function, the input semantic record 305.1 for the Transform-Data function 103 is automatically derived from the output semantic record of the Read-Data function 102 and because the user connected the Write-Data function to the Transform-Data function, the output semantic record 305.2 for the Transform-Data function 103 is automatically derived from the input semantic record of the Write-Data function 104. The user will further configure the Transform-Data function in the dataflow by specifying its transformation logic in a transformation editor. The semantic identities of the input semantic record and output semantic record are presented to the user in this editor. In the transformation editor, the user provides logic that specifies how output values in the semantic record are calculated. When the values are a direct move from input to output, a simple statement such as "output=input" can be used to automatically move data from input to output for any like-named semantic identities. When more specific rules are needed for an output field, they can be specified directly in the logic, for example:

output.full_name=string   concatenate(input.first_name," ",input.last_name)

As the user builds the dataflow and configures each function, the development tool will validate the dataflow according to the rules of the engine and present warnings and errors to the user so that the user may correct the dataflow. The user has the ability to synthetically debug (see FIG. 9) the Transform-Data function from within the development tool. The user may also execute the dataflow from the development tool; in this scenario the execution may be performed by a local instance of the engine which is installed with the development tool, or on a remote instance of the engine which has been installed in an environment configured to support such testing. In either case, the machine hosting the engine requires that any client access technologies relied on by the data access configurations 309 for each function in the dataflow already be configured on the same machine; for example, in order to write to a table, the correct database drivers must be configured on the machine whose engine will be using those drivers to perform that operation. At any time during this development process, the developer may "check-in" the dataflow to the repository. This process is conventional in terms of workflow and implementation; the user may provide a comment for the change and a new version of the new dataflow will be added to the source control system in the repository.

I. Hybrid Version Control System

The project artifacts, which are maintained via conventional source control mechanisms as described, the project staging controls (described below), and the project model which models those sources in a relational database, are maintained using a hybrid version control system, comprising both a standard version control system and a relational database. Traditionally, version control systems have made it possible to record individual changes made to versioned artifacts, but do not allow for the analysis of these changes using standard relational database query techniques. Using pure relational database systems, however, it is extremely difficult to provide version control functionality. Additionally, a conventional source control system does not inherently control access to system sources based on the development life-cycle stage of the project; such systems must rely on externally defined and enforced business practices to control access. The hybrid version control system disclosed herein allows for both conventional artifact versioning/source control and relational data modeling of the same artifacts. The hybrid version control system also provides built-in support for controlling access to project sources according to the current stage of the project.

Figure 4:
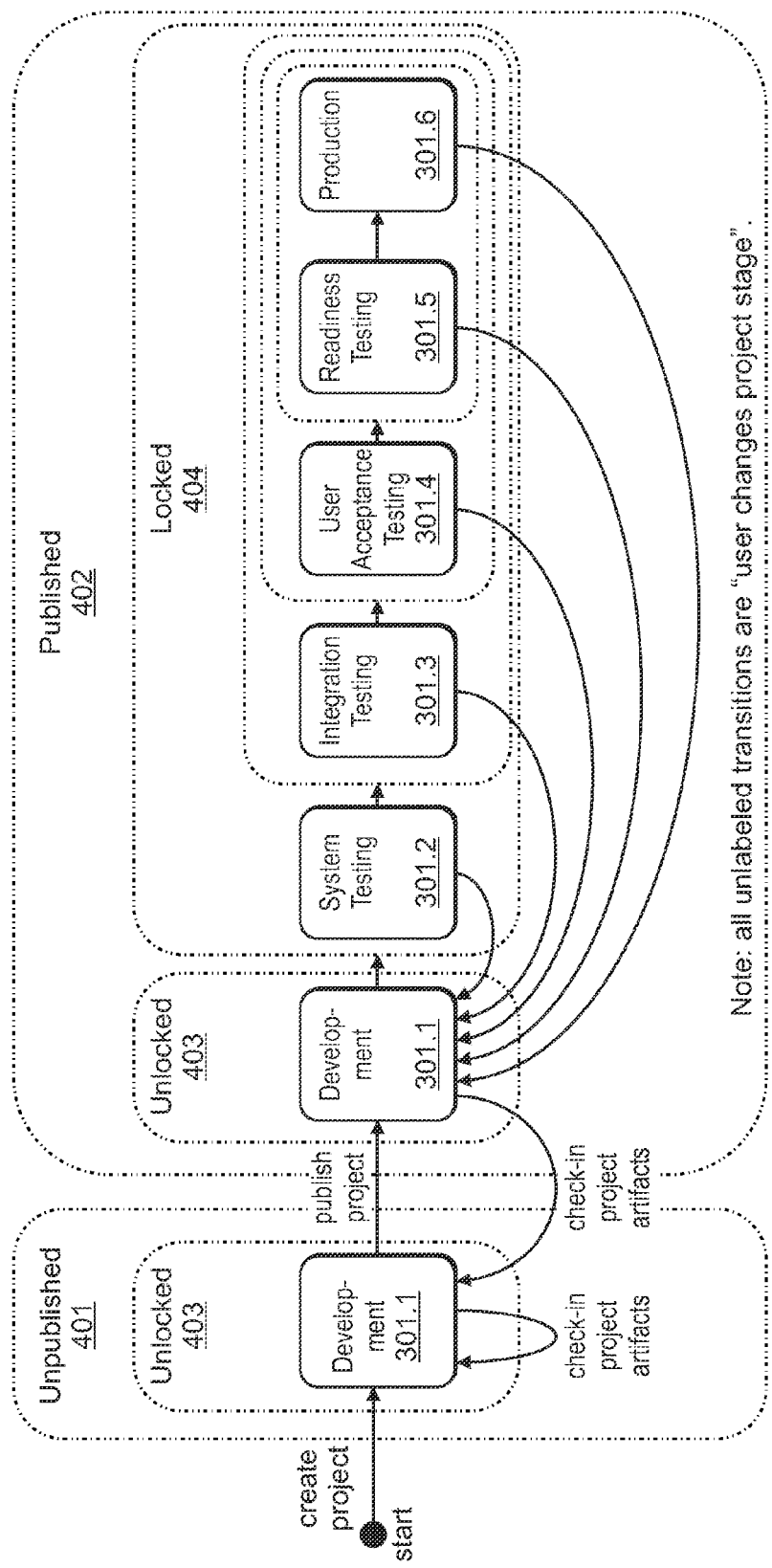
FIG. 4 is a UML state diagram that depicts relationships among the various project stages, according to certain embodiments of the invention.

FIG. 4 is a UML state diagram that depicts relationships among various project stages 301, according to a preferred embodiment. The staging model provides control for moving a project through a development life-cycle.

At any given time, a project may be in at most one of the following deployment stages (analogous to states in a state transition diagram): development 301.1, system testing 301.2, integration testing 301.3, user acceptance testing 301.4, readiness testing 301.5, or production 301.6.

Each one of these stages has two superstates. The first superstate signifies whether a project is unlocked 403, which means that changes to project artifacts are allowed, or locked 404 which means that changes are not allowed. The second superstate signifies whether a project is unpublished 401, which means that the project model has not been refreshed from the most recent changes to project artifacts, or published 402 which means that the project model is fully representative of the current project artifacts.

In a preferred embodiment, a project is created, published, and staged using the project maintenance tool 205. Individual artifacts and changes to them are stored as separate versions in the repository's source-control system using the system's tools such as the project maintenance tool 205 and the development tool 206. User permissions related to project development may be implemented using any user authentication/control databases, such as LDAP and ActiveDirectory.

After a project is created, it is unpublished 401 and in the development stage 301.1. Artifacts may only be added, modified, or removed from source control when the project is in the development stage which also implies that the project is unlocked 403. When a project is "published," all of the information stored about the project in the version control system, including, for example, new versions of dataflows and functions, checkin/checkout log entries and times, etc., is moved into a relational database, the contents of which can be queried using conventional relational techniques. After a project is published it will be in a published state such that the repository's relational model of the project has been updated from all current project artifacts in source-control, making the project available for post-development deployment staging.

The project artifacts are moved from the source control system to the relational database using conventional serialization methods and systems. When it is published to the database, it does not replace the older published version of the project, but is stored as a separate publication. Thus, queries executed against the database may gather information and statistics about multiple publications.

If changes are again made to project artifacts while in the development stage, the project will again be in an unpublished state until being explicitly published again. From a published superstate a project in the development stage may be staged forward to any post-development stage including production 301.6. After being staged out of development, the project is in a locked superstate such that artifacts cannot be modified until the project is staged back to development.

As an example, after development 301.1 is complete, the project for the sample application 101 may be published and moved to a system testing stage 301.2. While in this stage, various system tests are performed on the application and changes to the project's artifacts are prohibited. If system testing is successful, the project may be moved to an integration testing stage 301.3. While in this stage, one of the tests uncovers an issue that must be addressed by a slight change to the configuration of the Write-Data 104 function in the dataflow for the application. The project is moved back to the development stage 301.1 so that a developer can make this change. After the change is tested by the developer and checked-in, the project is published again and moved back to the integration testing stage 301.3 for re-test. The application might then pass testing at this stage and each subsequent stage until it is finally put into production 301.6.

Each time the artifacts are published, the project model 307 and project measures 308 are updated. Both the project model and measures are maintained as a relational model in the repository. This enables project managers, data architects, decision makers, and other system users to query and analyze the project and projects in interesting ways. For example, a project manager may quickly learn in which projects a developer user has used a particular semantic record (which may be known to be broken); or cumulative usage across projects of a certain table; or which output rules for a certain semantic identity are used most. This type of inquiry and analysis is possible because of the publish functionality in the repository.

Some project metrics may use information from the source control system as well as the repository. Because a source file may be checked-out and checked-in multiple times between publications, only the source control system contains information about these intermediate file-versions.

Figure 4A:
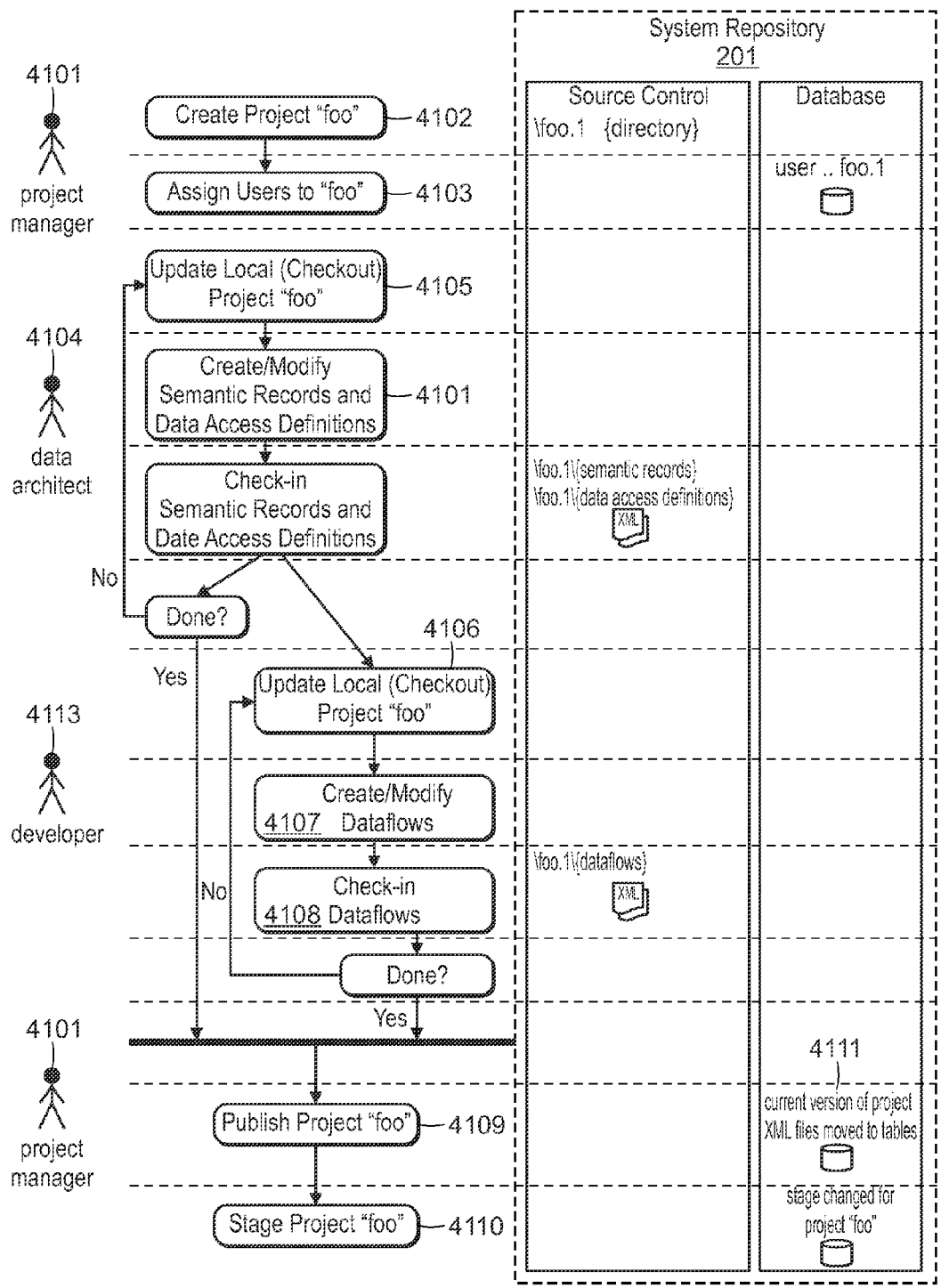
FIG. 4A is a flowchart that depicts various stages of project development, according to certain embodiments of the invention.

FIG. 4A is a flowchart that depicts the separation of roles across the various stages of project development, according to certain embodiments of the invention. The project manager 4101 creates a project called "foo" 4102 in the source control system, and assigns users 4103 to it. The data architect 4104 then checks out the project 4105 and creates or modifies the semantic records and data access definitions that will be used by the project "foo" 4112 (these are discussed in more detail below). When this step is complete, the developer 4113 checks out the project 4106 and creates and modifies the project's dataflows 4107 in the source repository, which specify the data transformation, extraction, and load rules used by the project and determine how data flows among these rules. When complete, the developer checks the project in 4108. At this point, the project manager 4101 publishes the project 4109, which moves the project artifacts into the relational database 4110. After the project has been published, it may be moved into the "staging" phase 4111. Eventually, the project state will be set to "production," the final phase of the project development process.

II. Identity-Based Semantic Model

Figure 5:
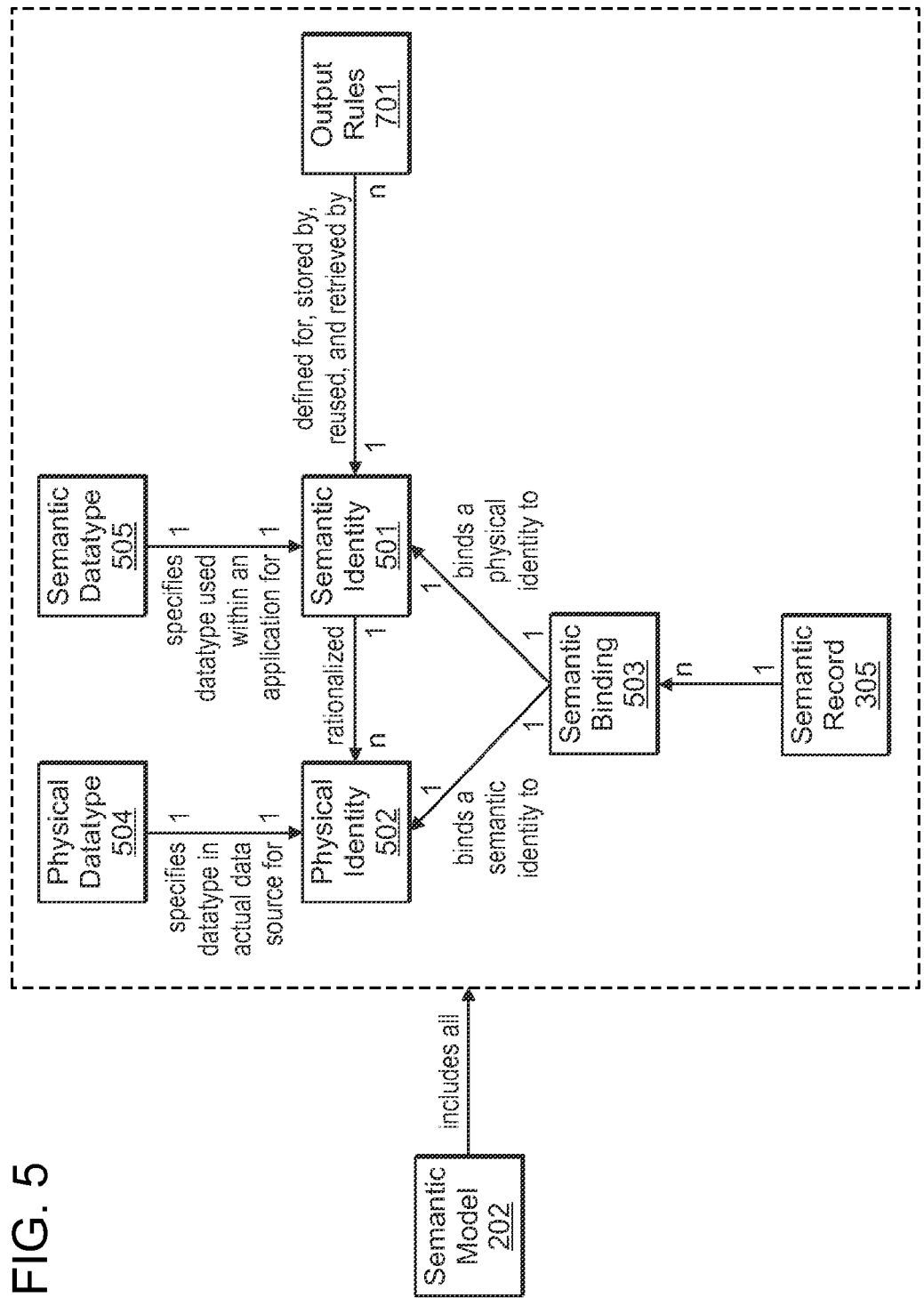
FIG. 5 is a relationship diagram that depicts components of the semantic model, according to certain embodiments of the invention.

FIG. 5 is a relationship diagram (as described above) that depicts the components of the semantic model 202 in the repository 201, according to a preferred embodiment. The semantic identity 501 is metadata that represents the abstract concept or meaning for a single business object that may be used in an enterprise; for example, an employee's last name. Additional properties of the semantic identity pertaining to its semantic type, subject area, and composition are also captured in the semantic model.

The output rule 701 defines the business logic for calculating a value for the semantic identity within a data integration application. A semantic identity may have multiple output rules. The output rule and its usage is described in more detail in a later section.

The physical identity 502 is metadata that captures the external (physical) name of a specific business object (e.g., a database column). The physical data type 504 captures the external (physical) data type of the associated physical identity (e.g., "20 character ASCII string"). The semantic data type 505 is associated with the semantic identity and specifies the data type of the data referenced by the semantic identity, as used internally by the data integration application. The physical data type is used by the engine when it is reading or writing actual physical data. The semantic data type is used by the engine when processing transformation logic in the application (described later).

The semantic binding 503 associates a physical identity with a particular semantic identity. Many physical identities and their physical attributes may be associated with the same semantic identity. For example, fields from various physical data locations such as lastName with a physical data type of CHAR(30) in one RDBMS table, last_name with a physical data type of VARCHAR(32) in another RDBMS table, and LST_NM with a physical data type of PICX (20) in a COBOL copybook, may all be physical instantiations of the semantic identity last_name, which could be universally associated with a semantic data type string.

A semantic record 304 describes the layout of a physical data structure such as an employee table. Each field in the table would be described with a semantic binding that captures the actual column name (the physical identity) and the semantic identity. Other metadata specific to each field in the employee table, such as data type information, would also be described for each field in the semantic record.

Using the semantic maintenance and project maintenance tools, a user would create and maintain the semantic model as follows. The user would first locate the actual metadata for the physical data that must be represented. As an example, using the sample application, this would be the metadata for the VSAM file being read and the metadata for the RDBMS table being written. The names and types of each field or column would be preserved as physical identities and physical data types. A rationalization process, using conventional string matching techniques and statistical methods, is then performed by the tool that takes each physical identity, decomposes it, analyzes it, and suggests zero or more semantic identities. The user makes the final decision as to which semantic identity most applies to each physical identity. When an existing semantic identity does not apply, the user may define a new one and its semantic data type. The physical identity, semantic identity, semantic binding, and other metadata gathered during the rationalization process, are saved in the repository.

The components of the semantic model are described in more detail below.

Figure 6:
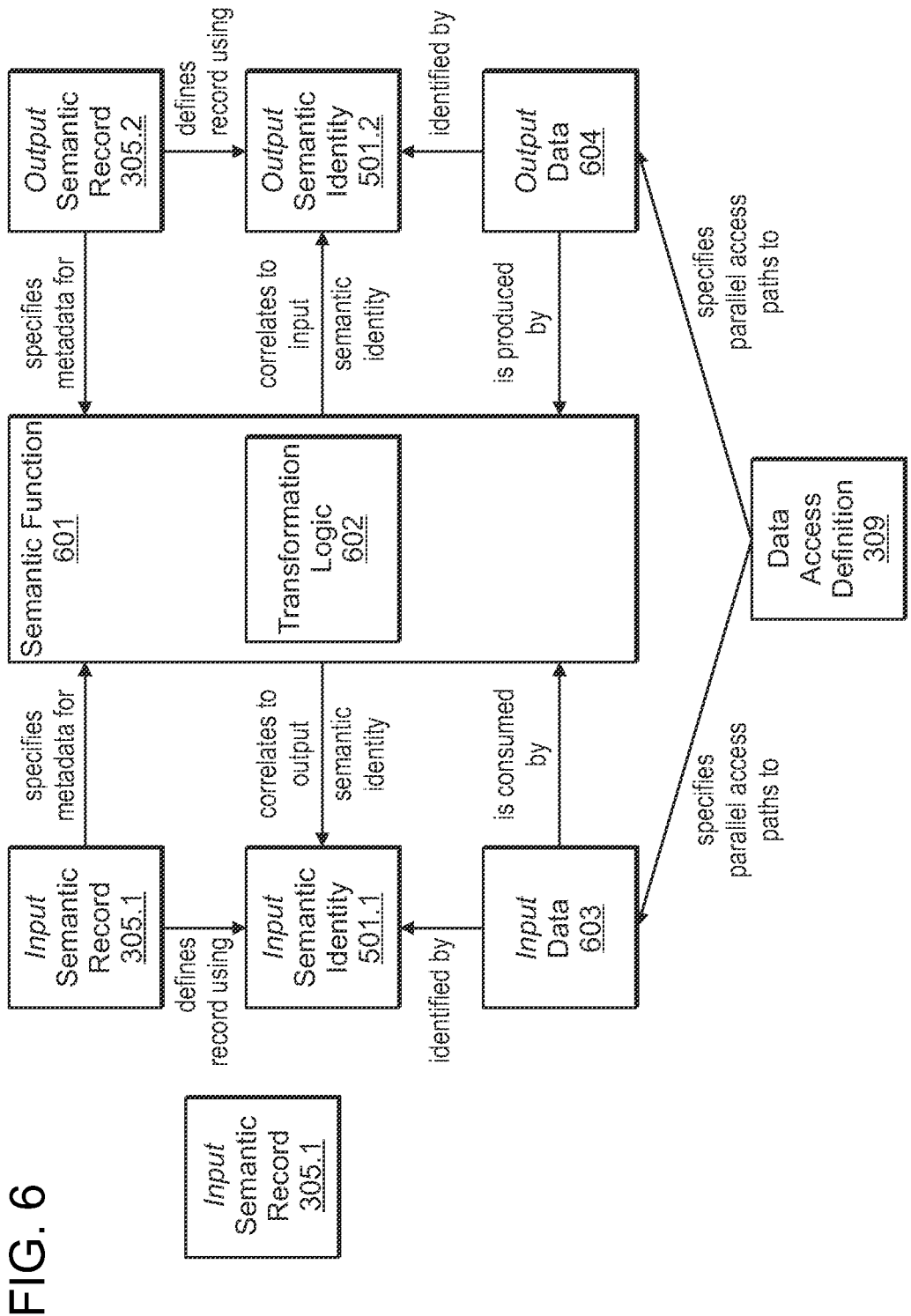
FIG. 6 is a relationship diagram that depicts the structure of a semantic data integration function within an application, according to certain embodiments of the invention.

FIG. 6 is a relationship diagram (as described above) that depicts the structure of a semantic data integration function within an application (such as the sample application described above) according to a preferred embodiment. A function 601 performs an individual body of work within an application. The function in FIG. 6 is a generic representation of any particular function in the present data integration system and could represent any of the functions 102, 103, or 104 in the sample application 101.

Depending on the type of function, the function may have the following types of input: input data 603, which is an actual input data value that the function will consume when it runs in the engine, an input semantic identity 501.1 is a semantic identity 501 from the semantic model shown in FIG. 5 that identifies an individual piece of data in a record that will be input to the function, and an input semantic record 305.1 is a semantic record 305 from the semantic model that describes the exact structure and format of a data record that will be input to the function.

Depending on the type of function, the function may have the following types of output: output data 604, which is an actual output data value that the function will produce when it runs in the engine, an output semantic identity 501.2 is a semantic identity 501 from the semantic model that identifies an individual piece of data in a record that will be output from the function, and an output semantic record 305.2 is a semantic record 305 from the semantic model that describes the exact structure and format of a data record that will be output from the function.

A data access definition 309 will also be associated with the function. When the purpose of the function is to read or write data from or to a physical data source, the data access definition will specify one or more URIs for accessing the physical data being read or written, each of which constitutes a parallel processing path (or channel) for the operation. When the function is an internal operation whose job is to manipulate data that has already been read (prior to writing), the data access definition identifies the particular channels that are relevant to the functions it is connected to.

Depending on the type of function, the function may also have transformation logic 609 which may be used to calculate the output values for the function.

A semantic function is able to correlate input data to output data using the semantic identities. For example, if the input semantic record 305.1 includes a field with semantic identity last_name 501.1 whose actual source is from a column named lastName 502 and if the output semantic record 305.2 includes a field with semantic identity last_name 501.1 whose actual data source is a field named lstNm in a file 502, provided that the semantic model captures these relationships, the function will know that the two fields are semantically equivalent because they share the same semantic identity last_name, and thus can move the correct input data 603 to the correct output data 604 with little or no additional specification.

Using our sample application as an example, the output semantic record 305.2 for the Read-Data function 102 may include a semantic binding 503 that binds the output semantic identity 501.2 last_name to a physical field named LST_NM in the data being read from the VSAM file 105. The input semantic record 305.1 for the Transform-Data function 103 may include the same semantic binding. The data coming from the VSAM file on the mainframe stores all last names in upper case; ex: SMITH. The transformation logic 602 in the Transform-Data function 103, which is a semantic function 601 like all functions in an application for the present invention, may be written to convert the input data 603 for input semantic identity 501.1 named last_name to title case; ex: Smith.

In writing this transformation logic, the developer only needs to know the semantic name last_name, and does not require any knowledge about the associated physical identity or the attributes of the VSAM source where the data is physically located. For example, suppose that in a different application in a different project, the physical identity for last_name data pulled from a mainframe was called NAME_LAST. As part of that effort, the semantic model were updated and a new additional semantic binding that associated NAME_LAST to the last_name semantic identity were created. The same transformation logic responsible for converting last_name to title case could be used because the transformation uses the semantic identity last_name that is common to both physical identities, LST_NM and NAME_LAST.

As a more complete example, suppose the VSAM file read by the example application has the following physical description:

TABLE 1

| VSAM Metadata | |
|---|---|
| Physical Identity | Physical Data type |
| ACC-NO | PICX(20) |
| TRANS-TYPE | PICX(1) |
| TRANS-AMT | 9(12)V9(2) |
| LAST-NAME | PICX(20) |
| FIRST-NAME | PICX(20) |
| ... | ... |

Suppose further that the RDBMS table written by the example application has the following physical description:

TABLE 2

| RDBMS Metadata | |
|---|---|
| Physical Identity | Physical Data type |
| accId | VARCHAR(32) |
| accBal | NUMERIC(10, 2) |
| lastName | VARCHAR(32) |

TABLE 2-continued

RDBMS Metadata

| Physical Identity | Physical Data type |
|---|---|
| firstName | VARCHAR(32) |
| ... | ... |

Outside of the context of the application project, a user would use the semantic maintenance tool to import the physical identities specified in Tables 1 and 2, in order to rationalize these physical identities to semantic identities, as described above (if the repository already contains semantic records corresponding to these two data tables, then it would not be necessary to import these physical identities again; for present purposes we assume that they are being imported for the first time). At this point, for each of these physical identities, the semantic maintenance tool will suggest corresponding semantic identities. The user can affirm or override these suggestions.

When this process is completed, the result is a mapping of (physical identity, semantic identity) pairs. Suppose, for the purposes of the present example, that this mapping is specified as follows:

TABLE 3

Mapping from Physical to Semantic Identities

| Physical Identity | Semantic Identity |
|---|---|
| ACC-NO | account_number |
| accId | account_number |
| accBal | account_balance |
| TRANS-TYPE | transaction_type |
| TRANS-AMT | transaction_amount |
| LAST-NAME | last_name |
| lastName | last_name |
| FIRST-NAME | first_name |
| firstName | first_name |
| ... | ... |

At this point, the user may associate the title-case rule (as described above) with the semantic identity last_name. This rule, along with any other rules created by the user and associated with semantic identities, are stored in the repository.

The user may now create semantic records corresponding to both the VSAM file and the RDBMS data sources, within the context of a specific project. These semantic records combine the physical metadata contained in Tables 1 and 2 with the semantic bindings in Table 3. For example, the semantic record SR1, corresponding to the VSAM file, would contain the following:

TABLE 4

Semantic Record for VSAM file (SR1)

| Phys. Ident. | Phys. Data type | Semantic Ident. | Semantic Data type |
|---|---|---|---|
| ACC-NO | PICX(20) | account_number | string |
| TRANS-TYPE | PICX(1) | transaction_type | string |
| TRANS-AMT | 9(12)V9(2) | transaction_amount | number |
| LAST-NAME | PICX(20) | last_name | string |
| FIRST-NAME | PICX(20) | first_name | string |
| ... | ... | ... | ... |

And the semantic record SR2, corresponding to the RDBMS table, would contain the following:

TABLE 5

Semantic Record for RDBMS table (SR2)

| Phys. Ident. | Phys. Data type | Semantic Ident. | Semantic Data type |
|---|---|---|---|
| accId | VARCHAR(32) | account_number | string |
| accBal | NUMERIC(10, 2) | account_balance | number |
| lastName | VARCHAR(32) | last_name | string |
| firstName | VARCHAR(32) | first_name | string |
| ... | ... | ... | ... |

These semantic records are saved in the repository as part of the project corresponding to the sample application. In the same project, a user would use the development tool to create a visual dataflow for the application that references these semantic records. To configure the Read-Data function, the user would specify metadata that identifies the location of the VSAM file from which the data must be read, and associate the previously-defined semantic record SR1 with the function as the function's output semantic record.

To configure the Transform-Data function, the developer would first connect the output of the Read-Data function to the input of the Transform-Data function, preferably via the graphical development tool, which represents functions and the connections between them using a graphical representation. Next, the developer would configure the output of the Transform-Data function to include the semantic identities listed in the semantic record SR2. When specifying semantic entities in the output of Transform-Data, the user will be presented with a menu of rules stored in the repository that operate on those identities (allowing the user to select only valid, predefined rules). In this case, suppose that when the user specifies last_name, the user selects the title-case rule (as defined above) from the rules menu.

Finally, the developer would connect the output of Transform-Data to the input of the Write-Data function, and specify the location of the RDBMS table to which the data must be written. As detailed above, the task of connecting two functions can be performed visually, using the graphical development tool. Throughout the process of configuring the application rules, the development tool never reveals the physical identities or data types of the source and target data to the user; this information is encapsulated in the semantic records SR1 and SR2, which are opaque to the application developer.

III. Output-Oriented Rules

Figure 7:
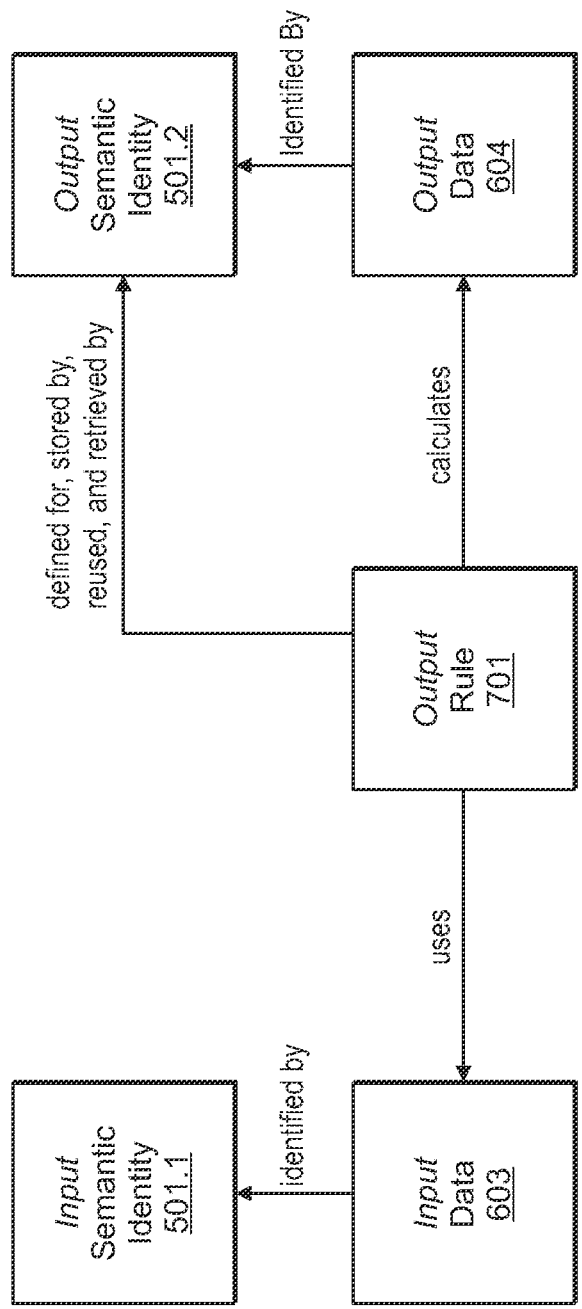
FIG. 7 is a relationship diagram that depicts an output-oriented rule definition, according to certain embodiments of the invention.

FIG. 7 is a relationship diagram (as described above) that depicts an output-oriented rule definition, according to a preferred embodiment. The rule 701 contains the logic and instructions to perform a calculation. Output data 604 is the actual data value that the rule will calculate and produce when it runs. An output semantic identity 501.2 is a semantic identity 501 from the semantic model that identifies the output data.

Depending on the type of rule, the rule may have input which is characterized as follows: input data 603, which comprises one or more actual input data values that the function will consume when it runs; an input semantic identity 501.1 is a semantic identity 501 from the semantic model that identifies an individual piece of data that will be input to the rule (an input parameter).

The rule 701 is defined to calculate a value for an output data field 604 with a given semantic identity 501.1. All input data 603 required by the rule is identified using semantic identities 501.

There may be an arbitrary number of rules associated with a given semantic identity. Using the semantic maintenance tool 204, these rules can be developed independently from the application or function, tested (described in more detail below), stored and indexed by semantic identity in the repository 201, and then used in the transformation logic of a function.

Traditional data integration processes and systems lack the ability to semantically reconcile fields in different systems that are being integrated. In such processes hundreds, if not thousands, of business rules are documented for the purpose of mapping fields in source systems to the appropriate fields in target systems. In the present data integration system, because application functions can automatically correlate input and output data semantically, the system does not require a process to capture or implement data mapping rules as in conventional systems. These differences are explained in more detail in the examples below.

However, rules that perform some operation other than a direct move between input and output are still needed. The semantic data integration system optimizes the definition and employment of rules by semantically orienting them explicitly to output calculation as described.

Recalling the example presented in discussion of FIG. 6, the transformation logic associated with converting a last name to title case could be captured as a reusable output-oriented rule for the last_name semantic identity. This rule could be used in the sample application, as well as other applications in the same or different projects.

Figure 8:
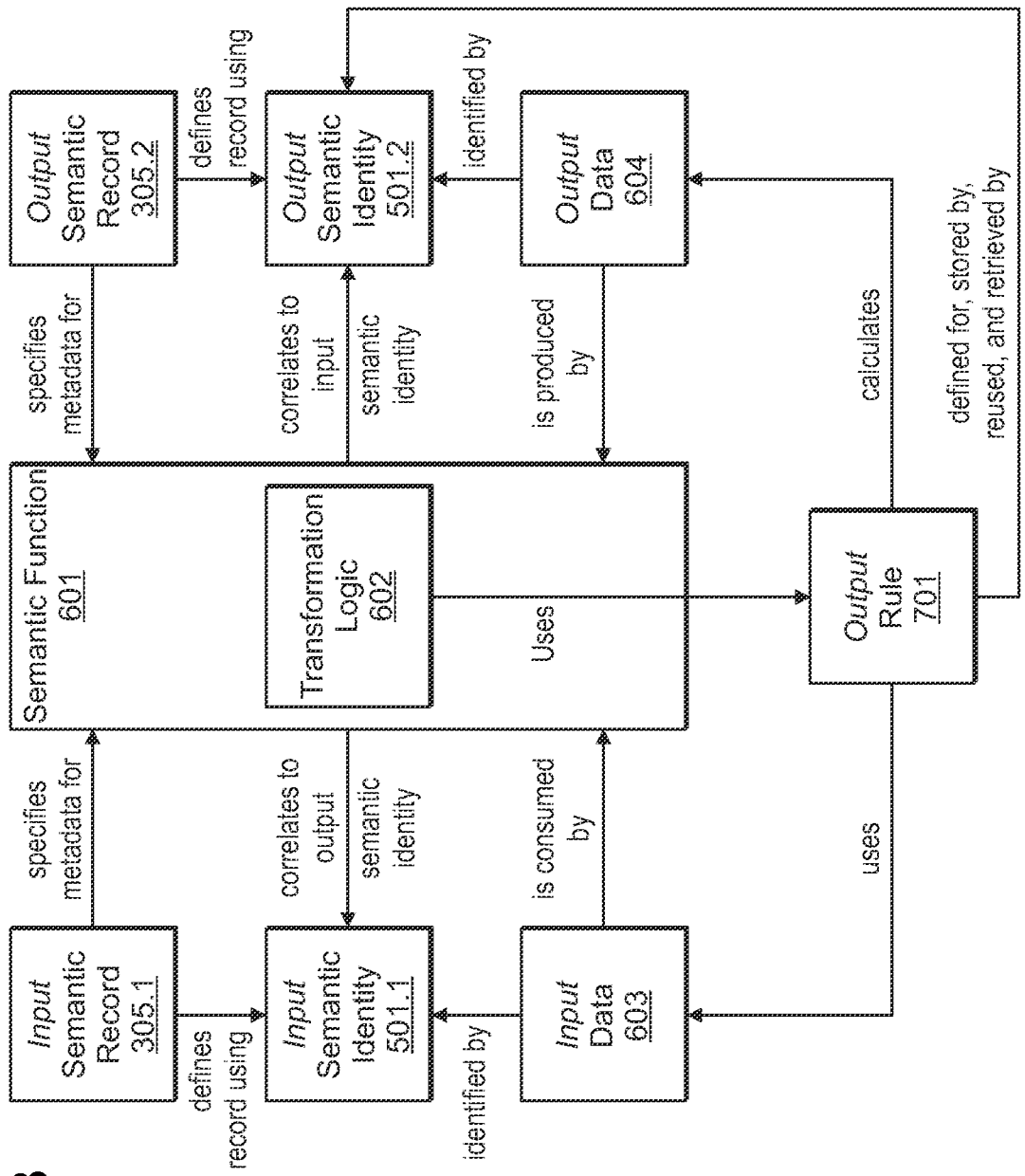
FIG. 8 is a relationship diagram that depicts the use of output-oriented rules in a function, according to certain embodiments of the invention.

FIG. 8 is a relationship diagram (as described above) that extends FIG. 7 and adds the concept in FIG. 7 to depict the preferred embodiment of output-oriented rules employment in a function 601.

Transformation logic is configured for the function to perform various transformations or manipulations on the input data 603 in order to produce the correct output data 604. Rules refer to input data and output data using semantic identities 501.1 and 501.2 respectively.

As described above, an example of a rule used in a function may be something trivial such as changing the case of last name. It may also be used for something more complex such as calculating a weighted account average balance. Preferably, rules are specified using a standard programming language that has been extended to include primitives that operate on typical database fields.

Using our sample application 101 as an example, when the Transform-Data 103 function is being configured by a developer, the calculations for its individual output fields are defined. The predefined output-oriented rule for title casing last_name may be referenced and used to define the calculation for that field in the function. An example of an alternative embodiment of this process allows for a new output-oriented rule to be defined at the same time that the transformation logic for Transform-Data is being configured. In this case the pre-existing title casing rule might not already exist and the developer might add it and save it to the repository for general use.

As further examples of output-oriented rules, consider the rules shown in Table 6, below:

TABLE 6

Example Output-Oriented Rules

| Target | Rule |
|---|---|
| master_account_type_code | master_account_type_code |
| account_type_code | account_type_code |
| account_start_date | datetime.moment(account_open_date, "C") |
| account_expiration_date | account_expiration_date |
| account_ever_activated_code | if is.empty(account_date_first_active) then "N" else "Y" |
| next_account_number | account_number + 1 |

These rules are written in an untyped programming language, and type-conversions are performed by the system as necessary. Because the system performs type-conversions automatically, the application developer does not need to know the semantic data types of the semantic identities used in a rule. For example, the semantic identities account_number and next_account_number might have semantic data types of string, and would therefore be represented internally as sequences of characters. However, a developer might treat account_number as an integer, as illustrated in Table 6, where next_account_number is defined as account_number+1. In this case, the system will recognize that "+" is an operator that applies to integers, convert account_number to an integer and perform the requested calculation. Finally, it will convert the result to a string, since the semantic data type of next_account_number is string.

It is not necessary to include rules in the rules repository that merely pass the value of a semantic identity from input to output without applying a transformation (e.g., the rule for master_account_type_code in Table 6, above). This "pass-through" operation is the default behavior for semantic identities and will be applied if no rule is specified. Thus, although there is no rule for account_number specified above, any rule that receives account_number as part of its input semantic record will pass the received value through to its output semantic record.

By contrast, conventional integration systems require the source and target locations, table names, and data types used in a rule to be stored with the rule logic. Using the conventional approach, the rules described in Table 6 might be represented as shown below in Table 7:

TABLE 7

Traditional Representation of Transformation Rules

| Target Table | Target Column | Target Type | Rule | Source Table | Source Column | Source Type |
|---|---|---|---|---|---|---|
| ACC_INFO | MST_ACC_TYPE | INTEGER | MST_ACC_TYPE | ACCT_INF | MST_ACC_TYPE | INTEGER |
| ACC_INFO | ACC_TYPE_CD | CHAR(1) | ACC_CD | ACCT_INF | ACC_CD | CHAR(1) |
| ACC_INFO | ACC_ST_DATE | DATE | time(ACC_OP, "C") | ACCT_INF | ACC_OP | DATE |
| ACC_INFO | ACC_EXP_DATE | DATE | ACC_EXP_DT | ACCT_INF | ACC_EXP_DT | DATE |
| ACC_INFO | ACCT_EVER_ACT | CHAR(1) | iif is.empty(ACC_ACT) then "N" else "Y" | ACCT_INF | ACC_ACT | CHAR(1) |

TABLE 7-continued

Traditional Representation of Transformation Rules

| Target Table | Target Column | Target Type | Rule | Source Table | Source Column | Source Type |
|---|---|---|---|---|---|---|
| ACC_INFO | NXT_ACC_NO | CHAR(20) | tochar(toint(ACC_NO) + 1) | ACCT_INF | ACC_NO | CHAR(20) |
| ACC_INFO | ACC_NO | CHAR(20) | ACCT_NUM | ACCT_INF | ACCT_NUM | CHAR(20) |
| ACC_INFO | ACC_NO | CHAR(20) | tochar(ACCT_NO) | AC_DATA | ACCT_NO | INTEGER |

Specifying rules using the conventional approach (as illustrated in Table 7) requires that the developer know not only the physical locations and names of the business objects being referenced, but their internal data format as well. In such a system, the developer would be forced to perform type conversions explicitly: for example, to add "1" to ACC_NO, the rule "tochar(toint(ACC_NO)+1)" might be used (as opposed to the untyped rule definition account_number+1, as used above).

Also, using the conventional approach, it is necessary to specify pass-through rules: for example, two rules are defined for ACC_NO in Table 7, both of which read source data from different physical sources whose data are stored using different formats. As explained above, output-oriented rules do not require pass-through rules to be specified, because the physical data sources and data types are included as part of a semantic identity.

IV. Type-Based Semantic Model

Figure 17:
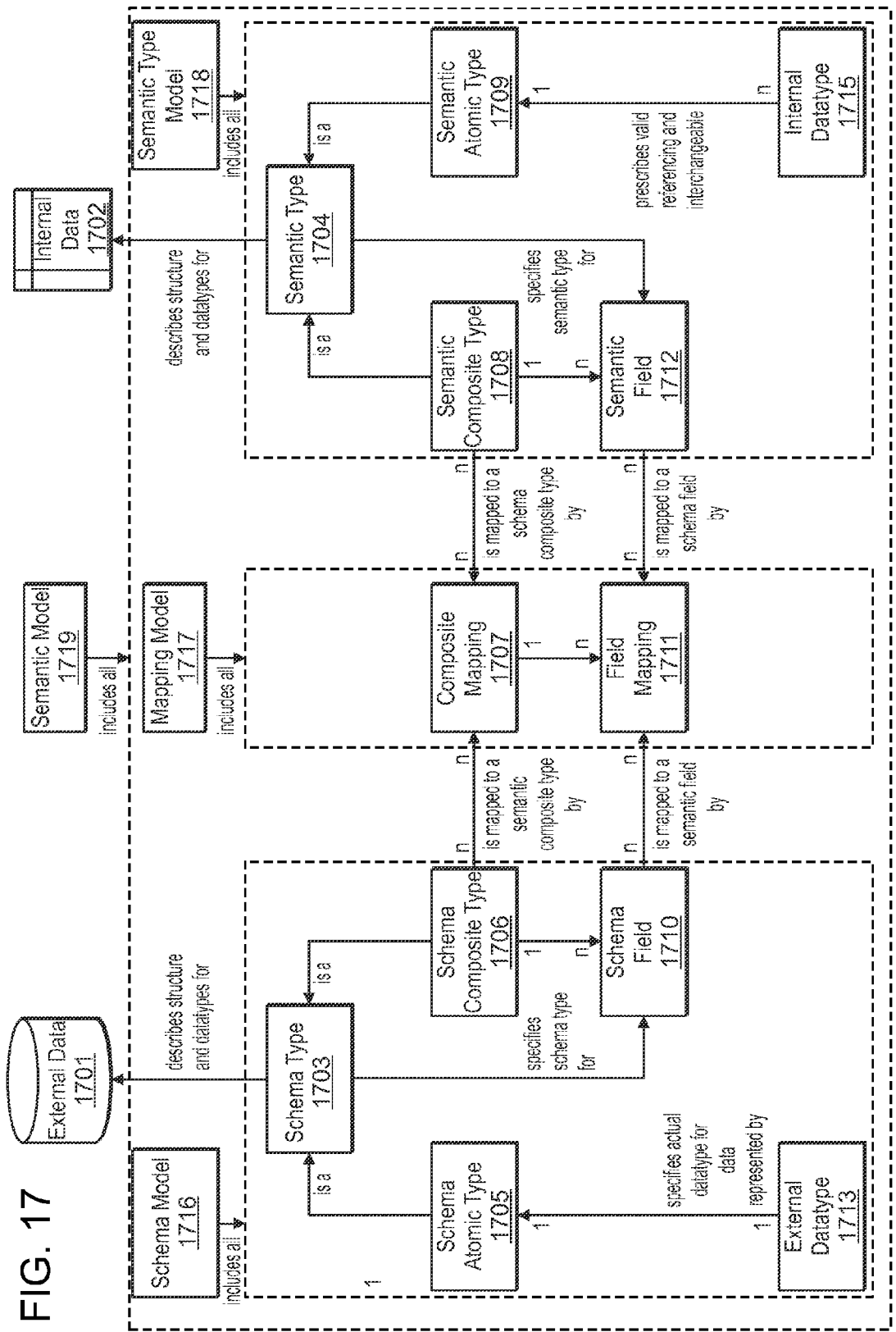
FIG. 17 is a relationship diagram that depicts various components of the type-based semantic type model, according to certain embodiments of the invention.

FIG. 17 is a relationship diagram (as previously defined) that depicts the components of the semantic model 1719, according to a preferred embodiment. In this model the semantic type 1704 plays a more fundamental role to the process of semantic data integration than the semantic type 505 first described in FIG. 5.

For the sake of simplicity, data that lives in a data source system outside of the data integration application (e.g. when stored in a database table or delimited file) is referred to as External Data 1701. Data that has been read by the application but not yet written is referred to as Internal Data 1702. The Schema Type 1703 is an abstract concept representing those metadata elements or artifacts in the application that describe external data 1701. The Schema Atomic Type 1705 is a kind of Schema Type that describes a fundamental unit of data such as that stored in a string (e.g. EMPLOYEE_NAME) or binary encoded decimal (e.g. ACCOUNT_BALANCE). As such an External Data type 1713 specifies the actual physical data type and type constraints for any unit of data represented by a Schema Atomic Type. The Schema Composite Type 1706 is a kind of Schema Type that describes a data structure, often hierarchical or complex in nature, but different from a Schema Atomic Type in that it is a container for one or more Schema Fields 1710. Each Schema Field is defined by its own Schema Type 1703 which may be Atomic or Composite.

Although not documented in FIG. 17, it should be observed that any of the elements in the Schema Model 1716 may be further refined with additional properties that may be necessary to further describe the External Data 1701 in its entirety including, but not limited to, information about character sets, encodings, byte order, delimiters, formats, frequency, count, and conditional expressions to define any of these properties including optionality of the data element.

Data that has been read by the application but not yet written is referred to as Internal Data 1702. The Semantic Type 1704 is an abstract concept representing those metadata elements or artifacts in the application that describe Internal Data 1702. The Semantic Type embodies the meaning of a business object (or an aspect of that business object) and enables the user to precisely control which physical representations can be used to identify those objects and their related characteristics. The Semantic Atomic Type 1709 is a kind of Semantic Type that describes a fundamental unit of data such as that stored in a string (e.g. EMPLOYEE_NAME) or binary encoded decimal (e.g. ACCOUNT_BALANCE). As such an Internal Data type 1715 specifies the actual physical data type and constraints for any unit of data represented by a Semantic Atomic Type. It should be observed that an Atomic Type may be associated with one or more Internal Data types. This is because the Semantic Type, in general, and the Semantic Atomic Type, more specifically, are independent of any physical representation and that multiple physical representations can be used to refer to the same business object or concept.

The Semantic Composite Type 1708 is a kind of Semantic Type that describes a data structure, often hierarchical or complex in nature, but different from a Semantic Atomic Type in that it is a container for one or more Semantic Fields 1712. Each Semantic Field is defined by its own Semantic Type 1704 which may be Atomic or Composite.

It should be observed that any of the elements in the Semantic Type Model 1704 may be further refined with additional properties that may be necessary to further describe the Internal Data 1701 in its entirety including, but not limited to, formats, constraints, and functions for processing data defined by the Semantic Type.

As one can observe, conceptually, the Semantic model elements mirror the Schema model elements. However, the purpose of the Semantic Type is not to simply reflect the structure and type of an external data as an internal structure. Its purpose is to provide an abstraction layer to describe semantically equivalent data that may be named and stored differently in multiple external forms such as that described in earlier sections. Each Semantic Type represents the abstract concept or meaning for a business object that may be used in an enterprise.

The Composite Mapping 1707 associates a Schema Composite Type 1706 with a Semantic Composite Type 1708. Through multiple Composite Mappings, the same Semantic Composite Type may be mapped to multiple Schema Composite Types and the same Schema Composite Type may be mapped to multiple Semantic Composite Types. The ability to define multiple mappings will be described in more detail later.

Each Composite Mapping 1707 is composed of one or more Field Mappings 1711 which explicitly define the mapping from a Schema Field 1710 within the Schema Composite Type to a Semantic Field 1712 within the Semantic Composite Type.

It should be observed that any of the elements of the Mapping Model 1717 may be further refined with additional properties that may be necessary to further describe the mapping between Schema structures and Semantic structures including, but not limited to, target formats, validations, type conversions, and other data conversions that may be desired or necessary.

All of the elements modeled in FIG. 17 represent potential metadata artifacts of one or more projects or applications. The ability to define Schema elements, Semantic elements, and Mapping elements as reusable artifacts provides extensive metadata reusability in the area of ETL mapping and development.

Figure 23:
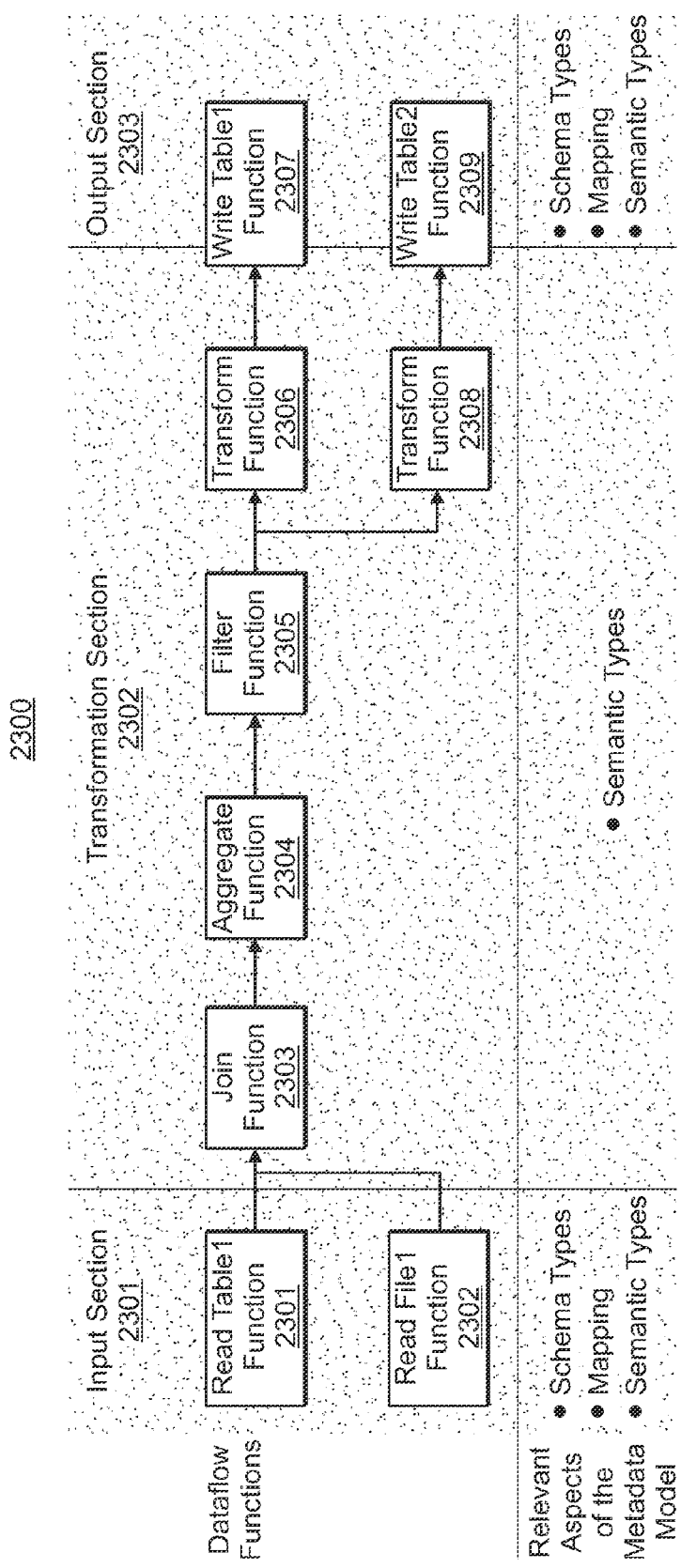
FIG. 23 is an annotated data flow diagram that highlights where the semantic model is used in the data flow in comparison to the schema model, according to certain embodiments of the invention.

FIG. 23 illustrates the anatomy of a dataflow for the purpose of highlighting where the semantic model, Mapping Model, and Schema Model is used each section of the dataflow.

The Input Section 2301 is the part of the dataflow that includes the functions that read external data for further processing by the rest of the dataflow. In this section, each input function must requires the knowledge of the Composite Schema Type of the external data to be read, the Composite Semantic Type that defines how the external data should be processed, and the Mappings from the Composite Schema Type to the Composite Semantic Type.

The Output Section 2303 is the part of the dataflow that includes the functions that write internally processed data to the external data systems. In this section, each output function requires knowledge of the Composite Semantic Type that defines the internal type of the data that was processed (but not yet written), the Composite Schema Type of the external data to write, and the Mappings from the Composite Semantic Type to the Composite Schema Type.

The Transformation Section 2302 is the bulk of the dataflow and includes the functions that perform all of the data transformation and manipulation. In this section, all data structures and fields are defined by the Semantic Types model.

As this diagram illustrates, the same application could be reused for different sources and targets simply by changing the Schemas and Mappings in the Input and Output Sections.

Figure 18:
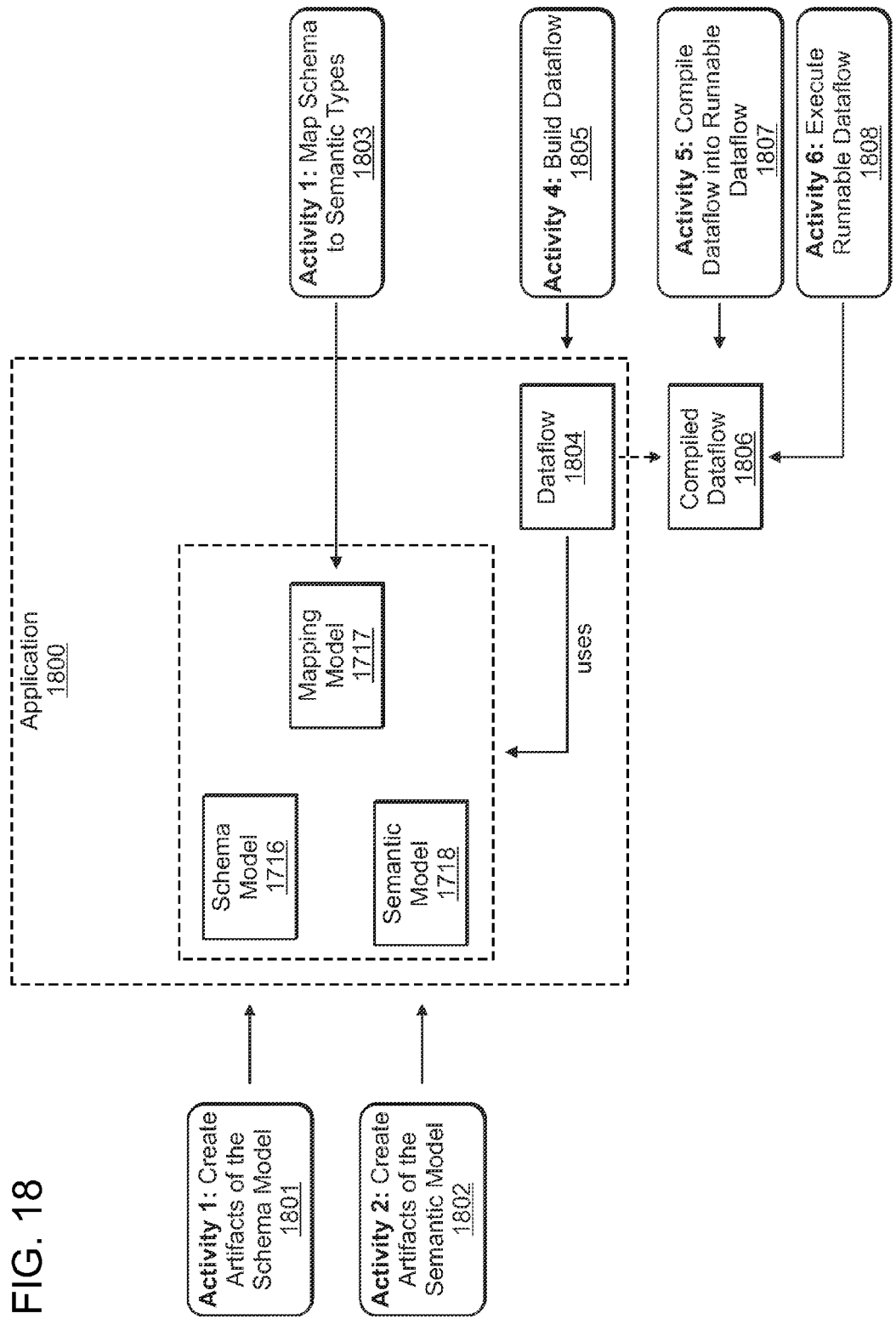
FIG. 18 is a user activity diagram that depicts various user activities when developing an application using the type-based semantic type model, according to certain embodiments of the invention.

FIG. 18 is a workflow diagram that depicts various user activities involved in creating the components of the type-based semantic model, to produce a data integration application in a present preferred embodiment.

In the first activity 1801, the user may create artifacts of the Schema Model 1716 by presenting native metadata for external data sources to the system. Using standard techniques, the system then automatically generates the elements of the Schema Model 1716 based on those metadata descriptions. Alternatively the user may define the elements of the Schema Model 1716 directly, that is without first presenting existing external metadata structures, by using appropriate user interfaces of the system.

In the second activity 1802, the user may create artifacts of the semantic model 1718 indirectly and directly. Indirect creation occurs through the creation of the Schema Model 1716 as previously described. In this approach, the system will automatically generate matching Semantic Types 1704 for the Schema Types 1703 it creates. Alternatively, the user may define the elements of the semantic model 1718 directly, that is without first presenting existing external metadata structures, by using appropriate user interfaces of the system.

In the third activity 1803, the user maps fields and types in the Schema Model 1716 to fields and types in the semantic model 1718. This mapping may occur indirectly and directly. Indirect mapping occurs through the creation of the Schema Model as previously described. In this approach, the system will automatically map the Schema Model 1716 to the semantic model 1718 that was created when the semantic model 1718 was automatically created from the Schema Model 1716. Direct mapping occurs when the user directly removes, modifies, or adds mappings between the Schema Model and the semantic model using appropriate user interfaces of the system.

In the fourth activity 1805, the user creates dataflows 1804 which specify the individual operations for extracting, transforming, and storing data as previously described in FIG. 1. The input and output operations of the dataflow will be configured to use a specific triplet of Schema Composite Type 1706, Composite Mapping 1707, and Semantic Composite Type 1708 (see FIG. 17).

In the fifth activity 1807, the user compiles the dataflow 1804 using the compiler provided by the system. The compiler will analyze the construction of the dataflow and validate the correctness of the semantic model and its use within the dataflow. If the dataflow is valid, a valid compiled dataflow 1806 is produced which may then be executed to perform the desired data processing.

In the sixth activity 1808, the user executes the compiled dataflow 1806 using the system's data integration engine as described in earlier sections.

It must be noted that these steps can be performed iteratively and often out of order from what was presented. For example, during the process of building the dataflow the user may stop to add or make changes to the schema model, semantic model, or mapping model, and then return to the dataflow to use those changes. Often times these steps will be performed in conjunction with running the dataflow, observing errors or unexpected behavior, and then returning to make additional changes to the application metadata necessary to correct these issues.

Figure 24:
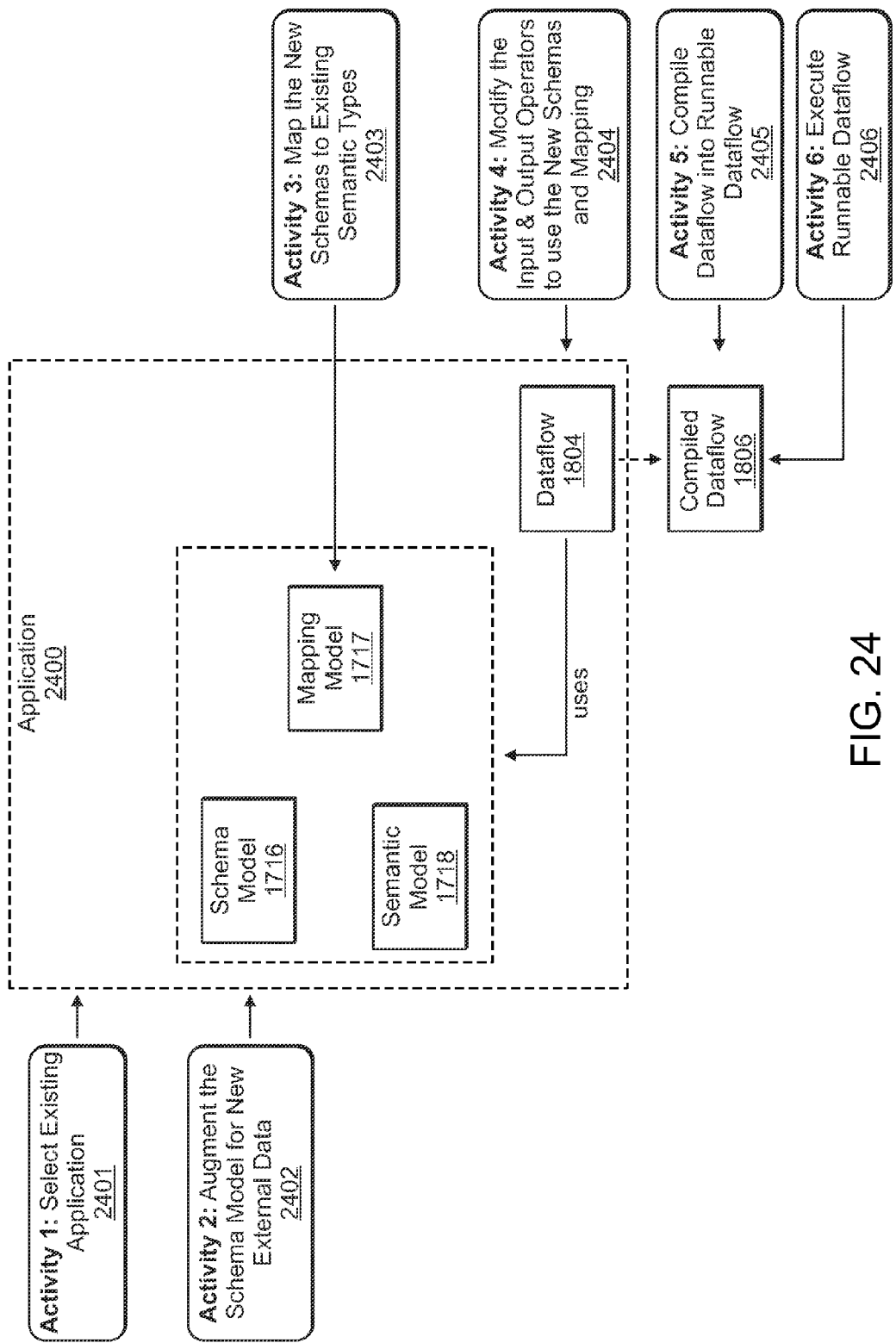
FIG. 24 is a user activity diagram that depicts various user activities when developing an application using the type-based semantic type model, according to certain embodiments of the invention.

FIG. 24 is another workflow diagram that depicts a set of user activities necessary to produce a data integration application using the type-based semantic model.

In the first activity 2401, the user starts by selecting an existing data integration application 2400 consisting of a dataflow and all of the metadata artifacts it uses.

In the second activity 2402, the user augments or modifies the Schema Model 1716 as needed to describe the new external sources and targets that the application must integrate.

In the third activity 2403, the user augments or modifies the Mapping Model 1717 as needed to map the fields and types in the new or modified portions of the Schema Model 1716 to the existing fields and types in the semantic model 1718.

In the fourth activity 2404, the user modifies each relevant input and output operator in the dataflow to use a new Schema Composite Type 1706 in the Schema Model 1716 and new Composite Mapping 1707 in the Mapping Model 1717 to an existing Semantic Composite Type 1708 in the semantic model 1718 (see FIG. 17).

The fifth activity 2405 and sixth activity 2406 are identical to those described above in relation to FIG. 18.

The activities shown in FIG. 24 present an alternative that more clearly illustrates how the injection of the Schema Model into the application can be deferred in the application development process.

Figure 19:
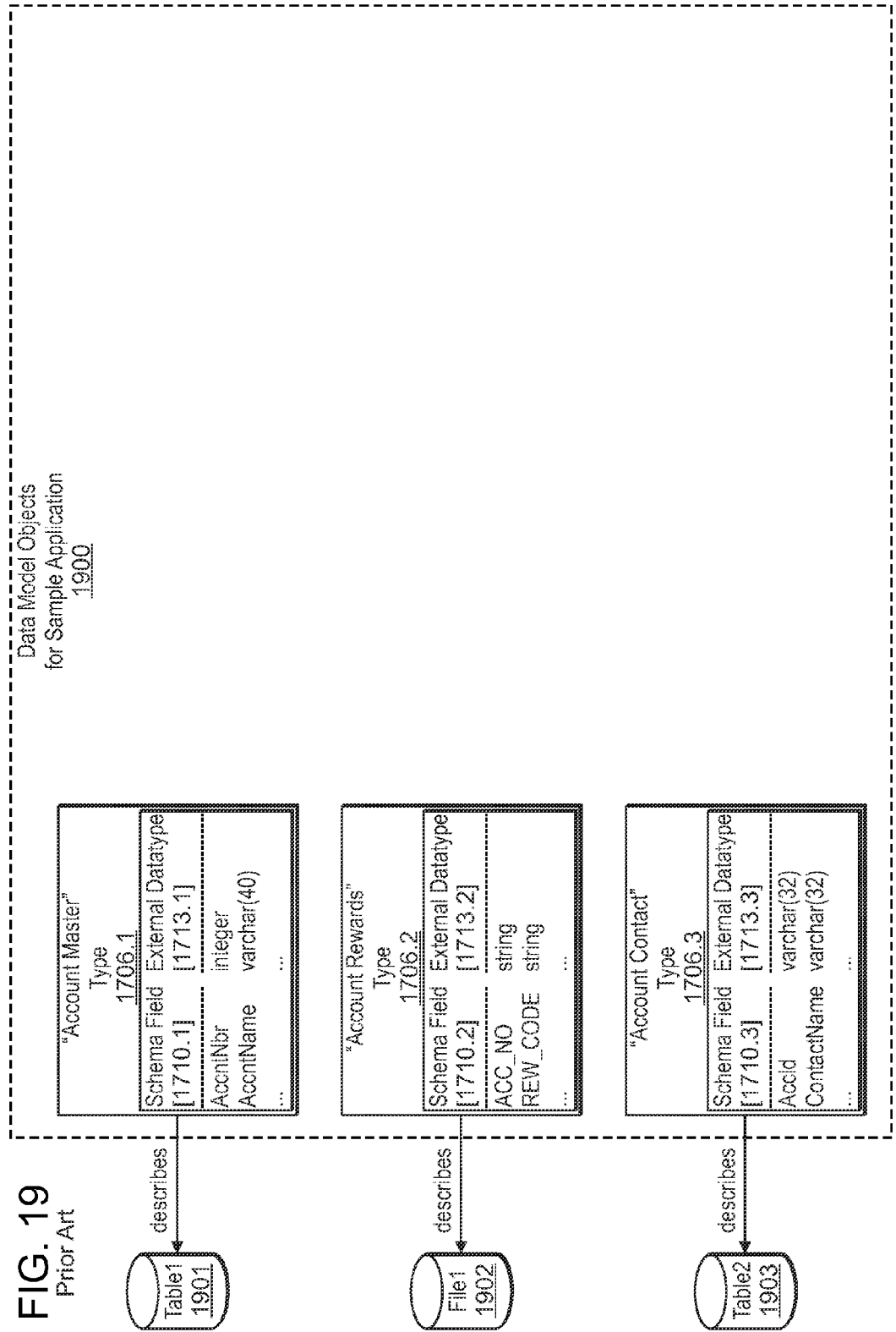
FIG. 19 is a relationship diagram that illustrates data model artifacts used in conventional data integration application.

FIG. 19 illustrates objects 1900 that would be defined in a conventional data integration application. In this example, there are three data sources 1901, 1902, 1903 each providing a different kind of data record for a customer account:

Table1 1901 is a database table that stores the account master record. The unique account number in this table is named AccntNbr and is stored as an integer.

File1 1902 is a delimited file that specifies reward information for specific accounts. The unique account number in this file is named ACC_NO and is stored as a string.

Table2 1903 is a database table that specifies contact information for the account. The unique account number in this table is named AccId and is stored as a string.

The data model artifacts that the conventional application uses to work with this data are described as follows:

The "Account Master" type 1706.1 includes one field 1710.1 for each column in Table1. The External Data types 1713.1 for these fields are also illustrated.

The "Account Rewards" type 1706.2 includes one field 1710.2 for each field in File1. The External Data types 1713.2 for these fields are also illustrated.

The "Account Contact" type 1706.3 includes one Schema Field 1710.3 for each column in Table2. The External Data types 1713.3 for these fields are also illustrated.

Even though the unique account numbers in each data source are identified differently and have different data types, they are semantically equivalent because they all represent the unique identifier for an account. However, because a semantic type model is not employed in this example, there is no means of capturing or using the semantic equivalence of each of these fields.

Figure 20:
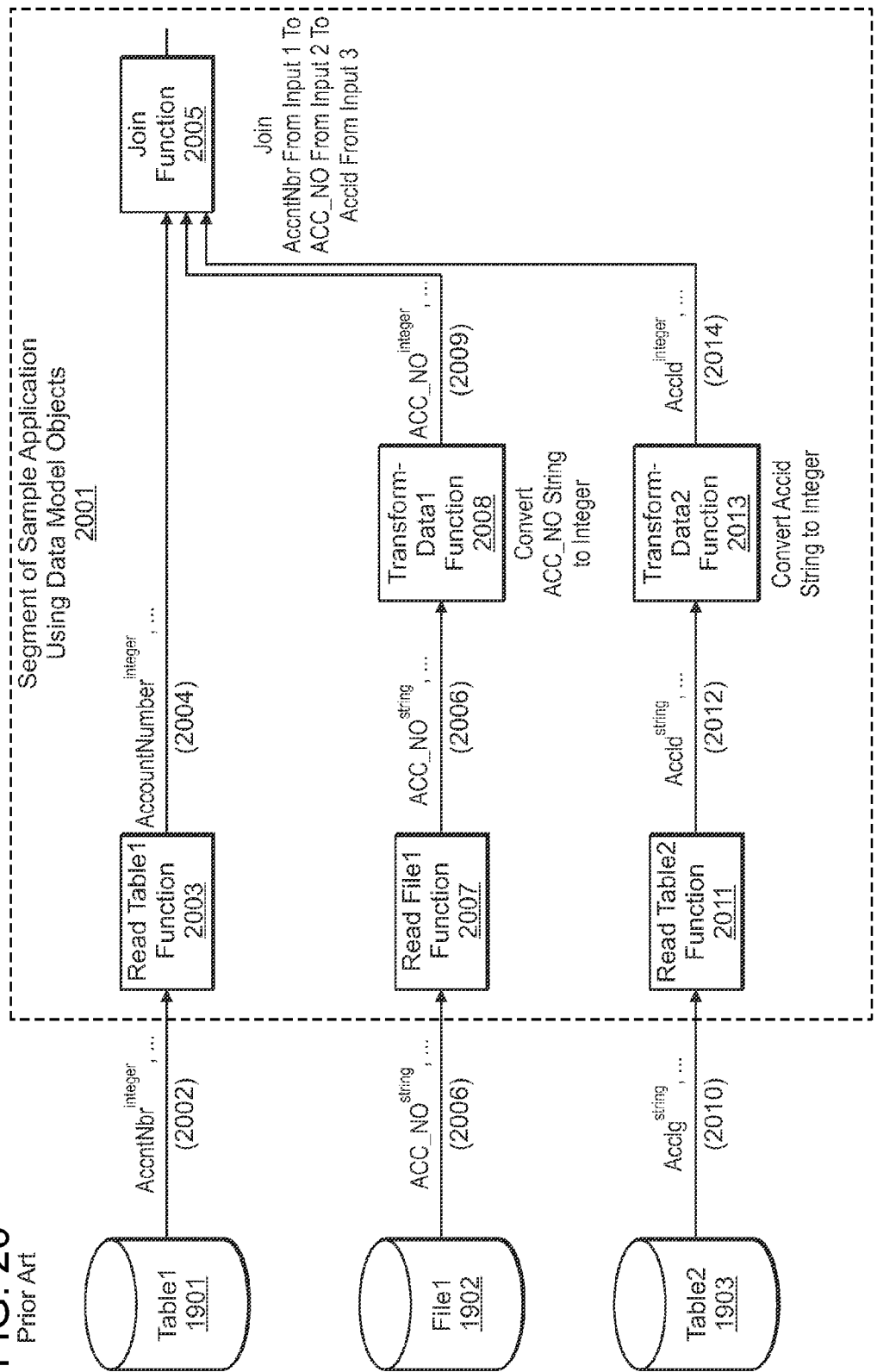
FIG. 20 is a data flow diagram that illustrates a segment of a sample application using conventional data model artifacts.

FIG. 20 illustrates the behavior of a segment of a dataflow 2001 in a conventional application. The purpose of this segment of the application is to join the records from the three data sources to produce a single record which can be processed by the remainder of the application. The records must be joined by using the field representing the "account number" from each data source.

The Read Table1 function 2003 reads records from Table1 1901 and outputs that data for use as input to the next function 2005. The Read File1 function 2007 reads records from File1 1902 and outputs that data for use as input to the next function 2008. The second Read Table2 function 2011 reads records from Table2 1903 and outputs that data for use as input to the next function 2013.

The Join function 2005 is responsible for joining these records by unique key. Because the application does not incorporate a semantic model, the developer of this application must identify AccountNbr, ACC_NO, and AccId as the unique keys from each record to join.

The Join operation requires the ability to compare data which, generally speaking, is done either by directly comparing the bytes that represent the data according to the fundamental data type of the fields being compared or by uniformly (across all fields necessary to compare for the entirety of the Join function) delegating the comparison to a function which is responsible for comparing two or more fields for equality according to the function's own definition of equality.

In this example, the Join function will directly compare the bytes that represent the data for the fields. However, because the byte representations for the data will be different because the data types used for the data are different, the user must add additional logic to the application. In this case the user converts ACC_NO from a string to an integer using Transform-Data1 function 2008 and AccId from a string to an integer using Transform-Data2 function 2013.

When this application is executed, the following flow and transformation of data occurs. Each record from Table1, identified by the field AccntNbr$^{integer}$ 2002 is read by Read Table1 function 2003. As indicated the data type of this field of data is integer. The Read Table1 function 2003 sends each record as output without changing the data for AccntNbr$^{integer}$ to the Join function 2005.

Each record from File1, identified by the field ACC_NO$^{string}$ 2006 is read by Read File1 function 2007. As indicated the data type of this field of data is string. The Read File1 function 2007 sends each record as output without changing the data for AccntNbr$^{integer}$. This data is received as input by the Transform-Data1 function 2008 which contains a transformation rule constructed by the developer of the function to convert the data from a string to an integer. As a result, this function will emit as output the data for this field as an integer ACC_NO$^{integer}$ 2009 which will be processed as input by the Join function 2005.

Each record from Table2, identified by the field AccId$^{string}$ 2010 is read by Read Table2 function 2011. As indicated the data type of this field of data is string. The Read Table2 function 2011 sends each record as output without changing the data for AccId$^{string}$. This data is received as input by the Transform-Data2 function 2013 which contains a transformation rule constructed by the developer of the function to convert the data from a string to an integer. As a result, this function will emit as output the data for this field as an integer AccId$^{integer}$ 2014 which will be processed as input by the Join function 2005.

For each triplet of records containing the same integer value for AccntNbr on the top input, ACC_NO on the middle input, and AccId on the bottom input, the Join function will produce one record as its output consisting of data from all three.

The next section describes a similar application as it would behave if implemented using the type-based semantic model, according to certain embodiments.

Figure 21:
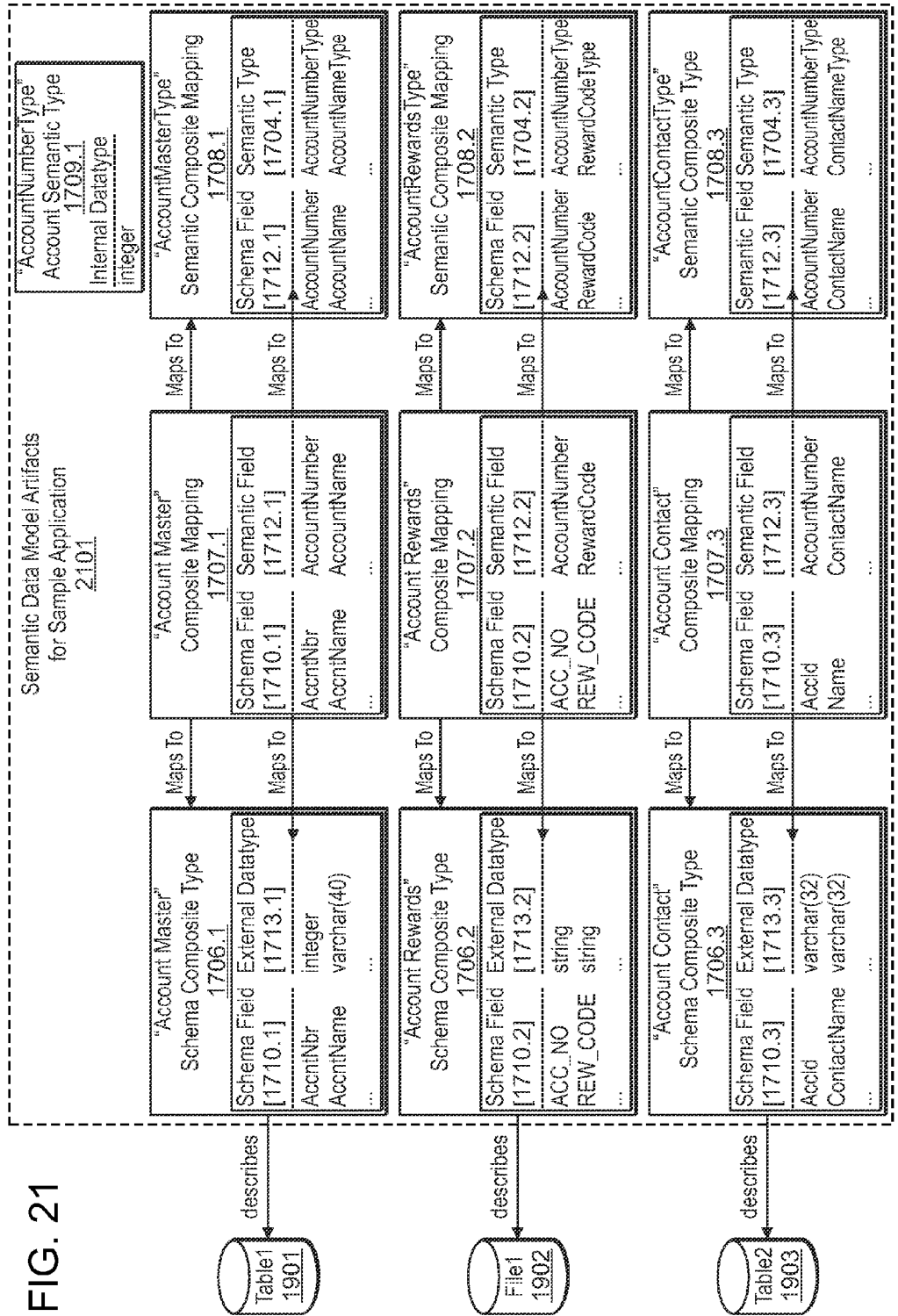
FIG. 21 is a relationship diagram that illustrates various semantic model artifacts of a data integration application using the type-based semantic type model, according to certain embodiments of the invention.

FIG. 21 illustrates semantic data model artifacts 2101 that would be defined for the same sample application segment previously illustrated in FIG. 20. These artifacts include:

The "AccountNumberType" Atomic Semantic Type 1709.1 has been defined to capture the common semantic concept of an account number. Data represented by this Semantic Type is specified to be of the integer internal data type.

The "AccountMasterType" Semantic Composite Type 1708.1 includes relevant Semantic Fields 1712.1 to define the semantic concept of an account master record. The Semantic Type 1704.1 for each Semantic Field is also defined.

The "AccountRewardsType" Semantic Composite Type 1708.2 includes relevant Semantic Fields 1712.2 to define the semantic concept of an account rewards record. The Semantic Type 1704.2 for each Semantic Field is also defined.

The "AccountContactType" Semantic Composite Type 1708.3 includes relevant Semantic Fields 1712.3 to define the semantic concept of an account contact record. The Semantic Type 1704.3 for each Semantic Field is also defined.

Notably, the "AccountNumberType" (1709.1) is specified as the type for the Semantic Field identified as "Account-Number" in each of the Semantic Composite Types defined.

The "Account Master" Mapping 1707.1 defines a Field Mapping between each Schema Field in the "Account Master" Schema Composite Type 1706.1 and the matching Semantic Field in the "AccountMasterType" Semantic Composite Type 1708.1.

The "Account Rewards" Mapping 1707.2 defines a Field Mapping between each Schema Field in the "Account Rewards" Schema Composite Type 1706.2 and the matching Semantic Field in the "AccountRewardsType" Semantic Composite Type 1708.2.

The "Account Contact" Mapping 1707.3 defines a Field Mapping between each Schema Field in the "Account Contact" Schema Composite Type 1706.3 and the matching Semantic Field in the "AccountContactType" Semantic Composite Type 1708.3.

Notably, each Schema Field that specifies the account number for the relevant data source (AccntNbr, ACC_NO, AccId) is mapped to the Semantic Field identified as "AccountNumber" and defined by the Semantic Type "AccountNumberType". This is because these fields are semantically equivalent. Because they are all mapped to the same Semantic Type, development and execution of the application will be streamlined as illustrated in the next section.

Figure 22:
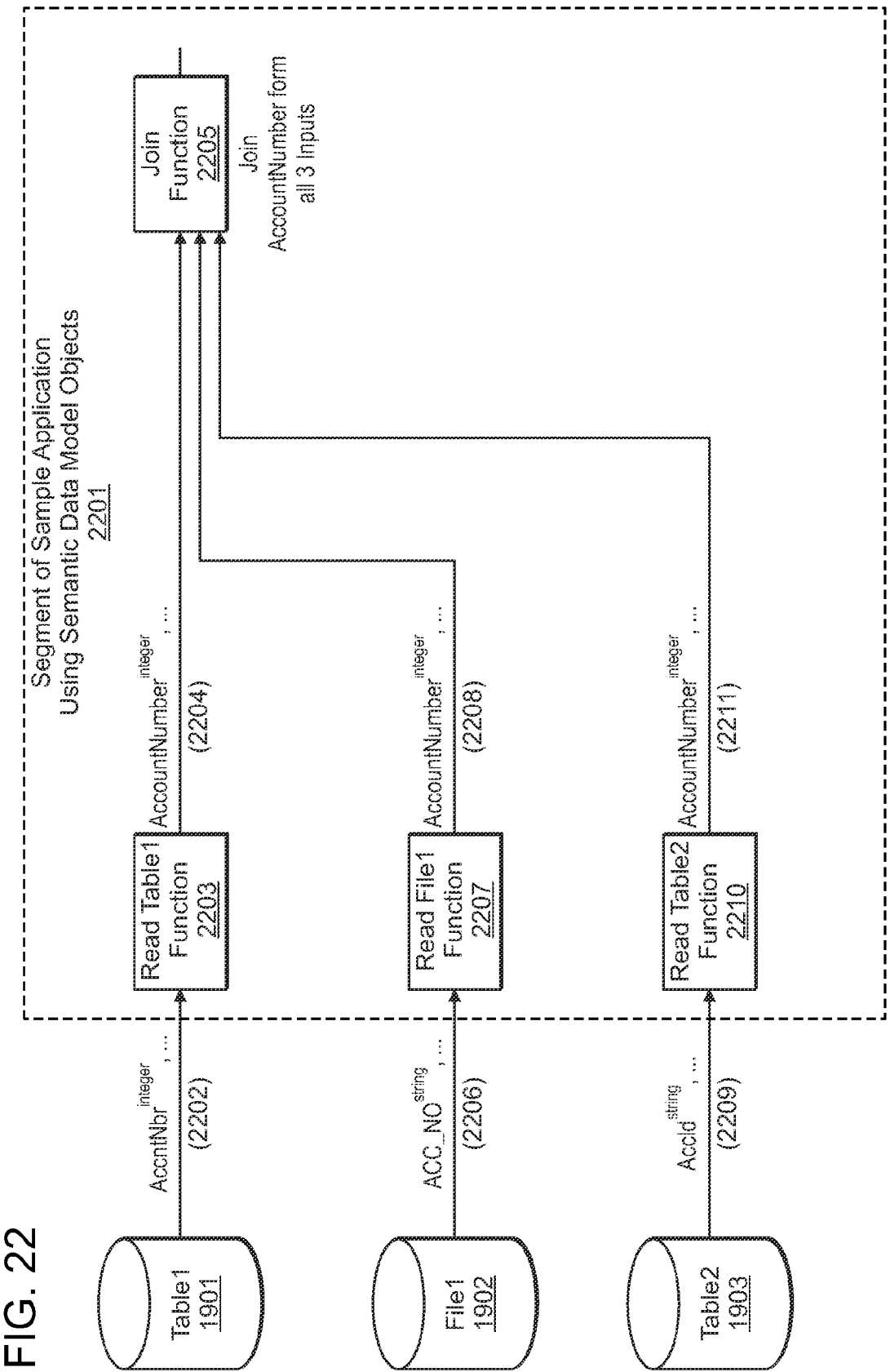
FIG. 22 is a data flow diagram that illustrates a segment of a sample application using semantic data model artifacts, according to certain embodiments of the invention.

FIG. 22 illustrates a segment of a dataflow in the sample application 2201 using the type-based semantic model approach. This segment has the same purpose as previously defined, but through the use of the semantic model, the complexity of the application has been reduced and the execution of the application has been streamlined.

Using the "Account Master" Schema Composite Type 1706.1 described in FIG. 21, the Read Table1 function 2203 is able to read records from Table1 1901 expecting an integer value for the AccntNbr field. Using the "Account Master" Mapping 1707.1, for each record read from Table1, the Read Table1 function 2203 will create an output record that matches the definition of the "AccountMasterType" Semantic Composite Type 1708.1 and it will map the field values that were read from Table1 to the corresponding fields in the output "AccountMasterType." In particular, the value of the $AccntNbr^{integer}$ field 2202 will be mapped to the $AccountNumber^{integer}$ field 2204. Because the Semantic Type for AccountNumber is the "AccountNumberType" and its data type is also integer, no data type conversion is applied.

Using the "Account Rewards" Schema Composite Type 1706.2 described in FIG. 21, the Read File1 function 2207 is able to read records from File1 1902 expecting a string value for the ACC_NO field. Using the "Account Rewards" Mapping 1707.2, for each record read from File1, the Read File1 function 2207 will create an output record that matches the definition of the "AccountRewardsType" Semantic Composite Type 1708.2 and it will map the field values that were read from File1 to the corresponding fields in the output "AccountRewardsType". In particular, the value of the $ACC\_NO^{string}$ field 2206 will be mapped to the $AccountNumber^{integer}$ field 2208. Because the Semantic Type for AccountNumber is the "AccountNumberType" and its data type is integer, the mapping operation performed within the Read File1 function (using standard type transformation algorithms) will automatically convert the value from string to integer.

Using the "Account Contact" Schema Composite Type 1706.3 described in FIG. 21, the Read Table2 function 2210 is able to read records from Table2 1903 expecting a string value for the AccId field. Using the "Account Contact" Mapping 1707.3, for each record read from Table2, the Read Table2 function 2210 will create an output record that matches the definition of the "AccountContactType" Semantic Composite Type 1708.3 and it will map the field values that were read from Table2 to the corresponding fields in the output "AccountContactType". In particular, the value of the $AccId^{string}$ field 2209 will be mapped to the $AccountNumber^{integer}$ field 2211. Because the Semantic Type for AccountNumber is the "AccountNumberType" and its data type is integer, the mapping operation performed within the Read Table function (using standard type transformation algorithms) will automatically convert the value from string to integer.

For each triplet of records containing the same integer value for AccountNumber from all of its inputs, the Join function 2205 will produce one record as its output consisting of data from all three.

The following salient points should be observed regarding the type-based semantic model application described above:

1. There is no need for the user to explicitly introduce transformation functions to perform type conversions from string to integer in the semantic application. Instead the input operations of the read functions implicitly perform these type conversions as described by the mappings and only when needed.
2. The concept of an "account number" is explicitly captured and defined in the semantic application.
3. "AccountNumberType" common Semantic Type, can be easily reused to represent external data. Once the mappings are applied, this field of data—regardless of how it was defined externally—is normalized for consistent and reliable processing within the application. Apart from its internal data type, if any constraints, formats, or other processing requirements or restrictions had been defined for that type of data, the system would have ensured the same set of rules for all data of that type regardless of source or target differences.

Although the sample application focused on the input ("extract") segment of the dataflow, the same principles apply to the output segment ("load") segment except that all of the processing works in the opposite direction. The mappings are used to map Semantic Types to Schema Types. If applicable, the same mappings may be used. Otherwise, a different set of mappings could be defined to capture the particular mapping characteristics for output.

V. Synthetic Debugging

Figure 9:
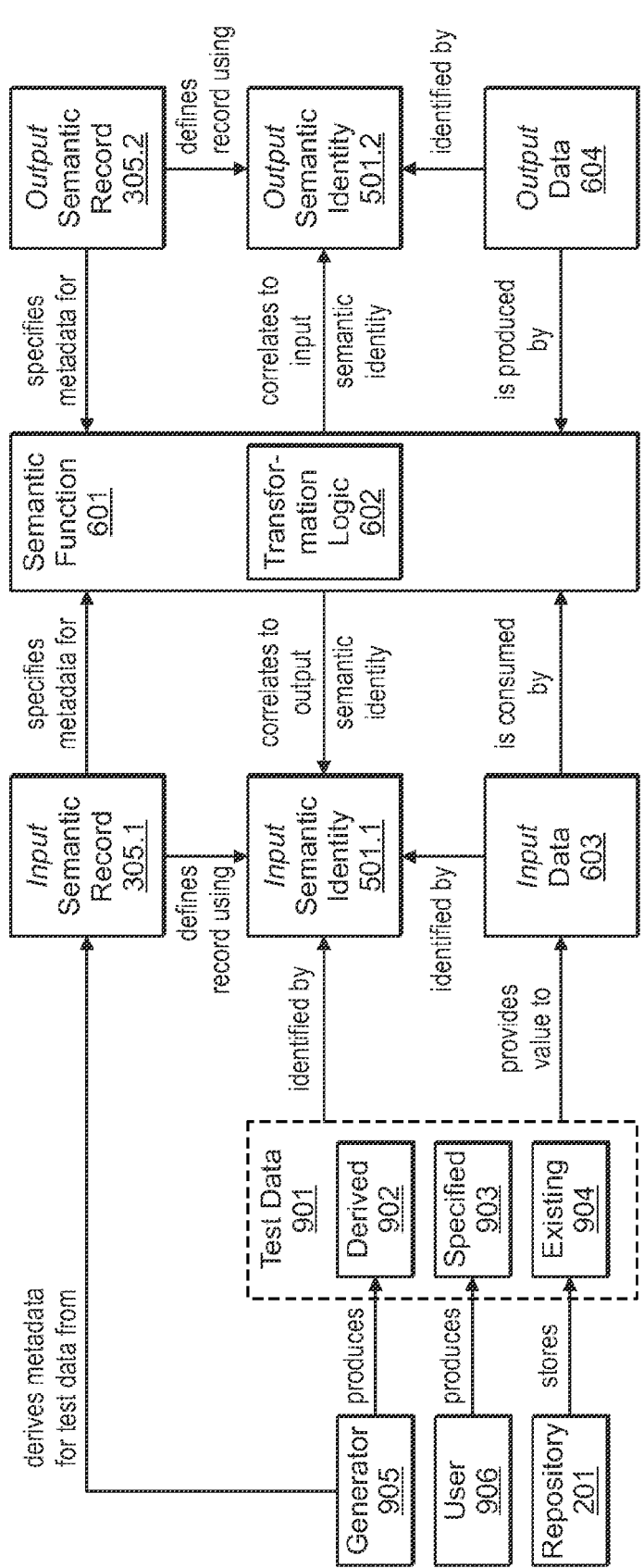
FIG. 9 is a relationship diagram that depicts function-level synthetic debugging and testing for semantic data integration, according to certain embodiments of the invention.

FIG. 9 is a relationship diagram (as described above) that extends FIG. 6 to depict the preferred embodiment of function-level synthetic debugging and testing for semantic data integration. A function 601 and its transformation logic 602 (as described above) may be tested using test data 901. Test data for each input semantic identity 501.1 may come from a variety of sources including: derived test data 902, which is be automatically derived from the input semantic record by a generator function 905, specified test data 903, which is manually specified by the user 906, and existing test data 904, which is retrieved from the repository 201.

The system preserves data security by not exposing actual business data values within the development tool or while a data integration application is being executed by the engine. In order to debug and test applications, synthetic debugging and testing is employed at the function level. The ability to provide synthetic test data also allows for offline development in situations when the actual data sources might not be available.

After initiating a debugging exercise from within the development tool, the user will assign test data 901 for each input semantic identity 501.1. Test data values can come from multiple sources. A test data generator function 905 can use information derived from the input semantic record 305.1 to synthetically generate test values 902, the user 906 may manually specify the test data values 903, or existing test data values 904 that are cataloged in the repository 201 by semantic identity may be used. The user may choose to store test data values for each semantic identity back to the repository for future debugging and testing. Once test data has been assigned, the user can test the function with these test values.

In this test one iteration of the function will run using the input test data to produce the function's output data 604 which can then be displayed by the development tool and validated by the user.

Using the sample application 101 as an example, a developer may want to synthetically debug the Transform-Data function 103, in particular the logic described above that changes the case of last_name. The developer may first try to re-use existing test data 904 from the repository. If no test data for last_name is found, the developer may try to generate test data 902. Using the metadata from the input semantic record, the test data generator 905 may generate test data 902 that looks like this: 'AaBbCcDdEeFfGgHhIiJj'. Upon testing this data with the function, the output correctly produces 'Aabbccddeeffgghhiijj'. In order to further validate the function, the developer specifies his own test data 903: 'sT. jOHn'. Upon testing this data with the function, the output correctly produces 'St. John'.

The developer saves this new test data to the repository so that it may be re-used the next time a developer needs test data for last_name. This is accomplished by, e.g., associating the new test data value with the associated semantic identity in a relational database table.

The ability to enter custom test data values allows the developer to ensure that a function responds appropriately to certain problematic input values that might not be generated by the random test data generator (e.g. integers that include random letters, negative account numbers, etc.). These custom values are associated with a semantic identity (e.g., last_name), so once entered, they can automatically be reused as test data for any function, in any project, that uses the same semantic identity.

VI. Enterprise Maintenance

Figure 10:
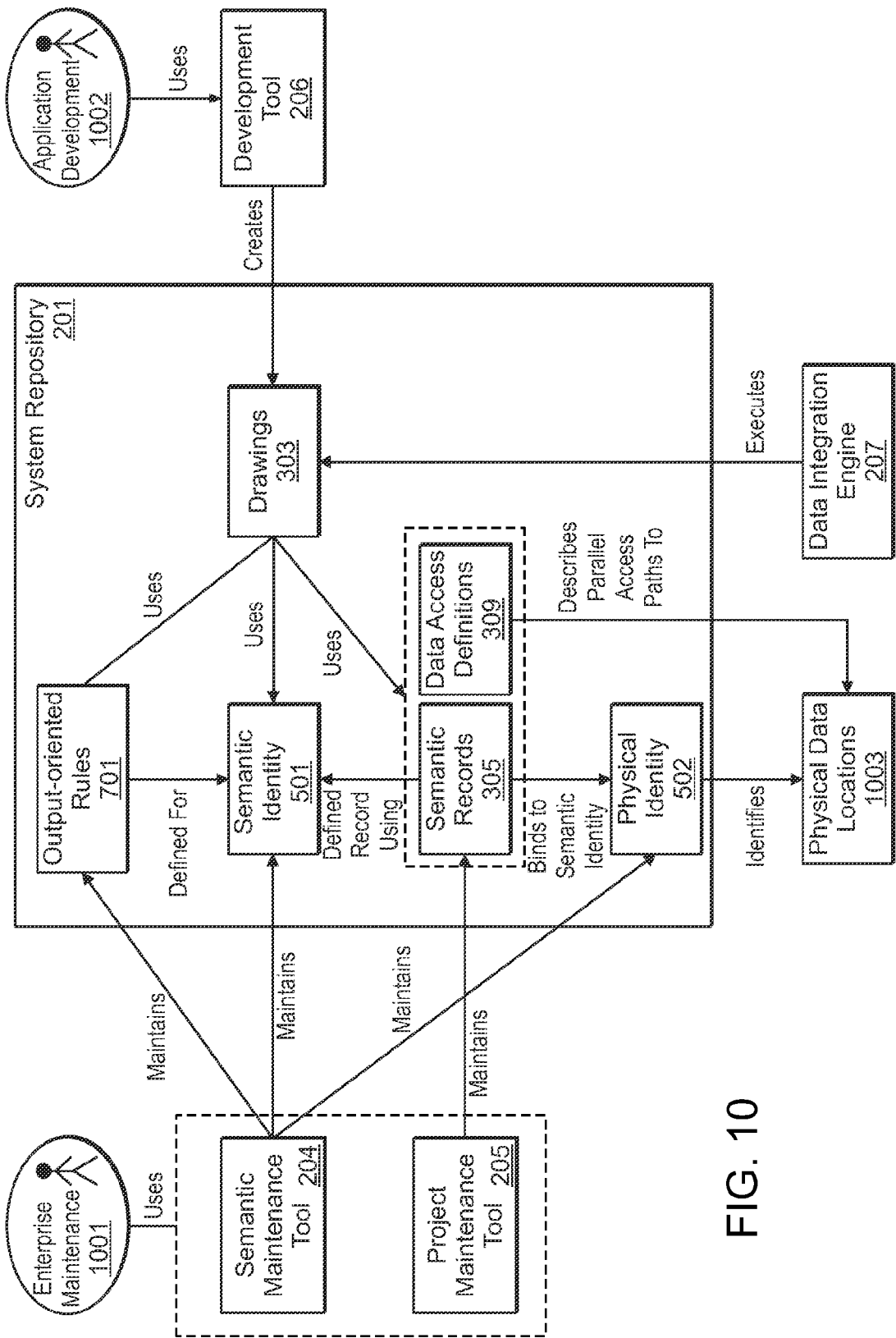
FIG. 10 is a diagram that illustrates the separation of development roles in a semantic data integration project, according to certain embodiments of the invention.

FIG. 10 combines a relationship diagram (as described above) and UML use-case diagram to depict the high-level separation of semantic data integration user activities, according to a preferred embodiment. Activities performed by system users can be classified either as enterprise maintenance or as application development.

Enterprise maintenance 1001 is performed with the semantic maintenance tool 204 and the project maintenance tool 205, and has two basic subcategories. Semantic maintenance deals with the maintenance of the semantic model 202 including semantic identities 501 and physical identities 502, and output-oriented semantic rules 701. Project maintenance is concerned with the maintenance of the project state and architecture-level objects such as semantic records 305 and data access definition 309 which may be defined at the project level or across the enterprise when reusability is possible.

Application development 1002 is performed with the development tool 206 and is concerned with the development of data integration dataflows 303 within or across projects. Application development involves many of the objects that fall within the purview of enterprise maintenance, such as semantic identities and output-oriented rules. However, physical identities are never referenced in the context of application development.

As a result of this enforced separation between application development and physical identities, the application developer does not require knowledge of physical identities 502 or physical data locations 1003. Applications may be developed independent of the physical data sources that they will integrate, providing a level of insulation from physical data sources whose location, connectivity, structure, and metadata may be unstable.

Recall the example first provided in the discussion for FIG. 3. In that example the project manager and data architect were performing enterprise maintenance 1001 activities as described above, including project maintenance. Additionally, a data steward would perform semantic maintenance, such that many of the semantic bindings 503 needed for the semantic records 305 created during project maintenance would already exist. When creating the semantic records that describe the VSAM file 105, the enterprise architect may discover that a semantic binding does not yet exist between the last_name semantic identity and the LST_NM field in the VSAM file. This binding could have been defined by a data steward during regular semantic maintenance activities. But if the binding does not exist, the data architect can also create that binding. Once all of the necessary semantic bindings exist, the data architect can complete the task of creating the semantic record for the VSAM file. Once the semantic record is complete and exists as a project artifact, the developer can be told to use that record.

The developer would then use that semantic record when creating the dataflow 303 that describes the actual application 101. At no point does the developer need to know anything about the physical nature of the VSAM file structure including the physical identities of its data. The developer can work strictly with semantic identities to define the data integration application.

VII. Data Integration Engine

Figure 11:
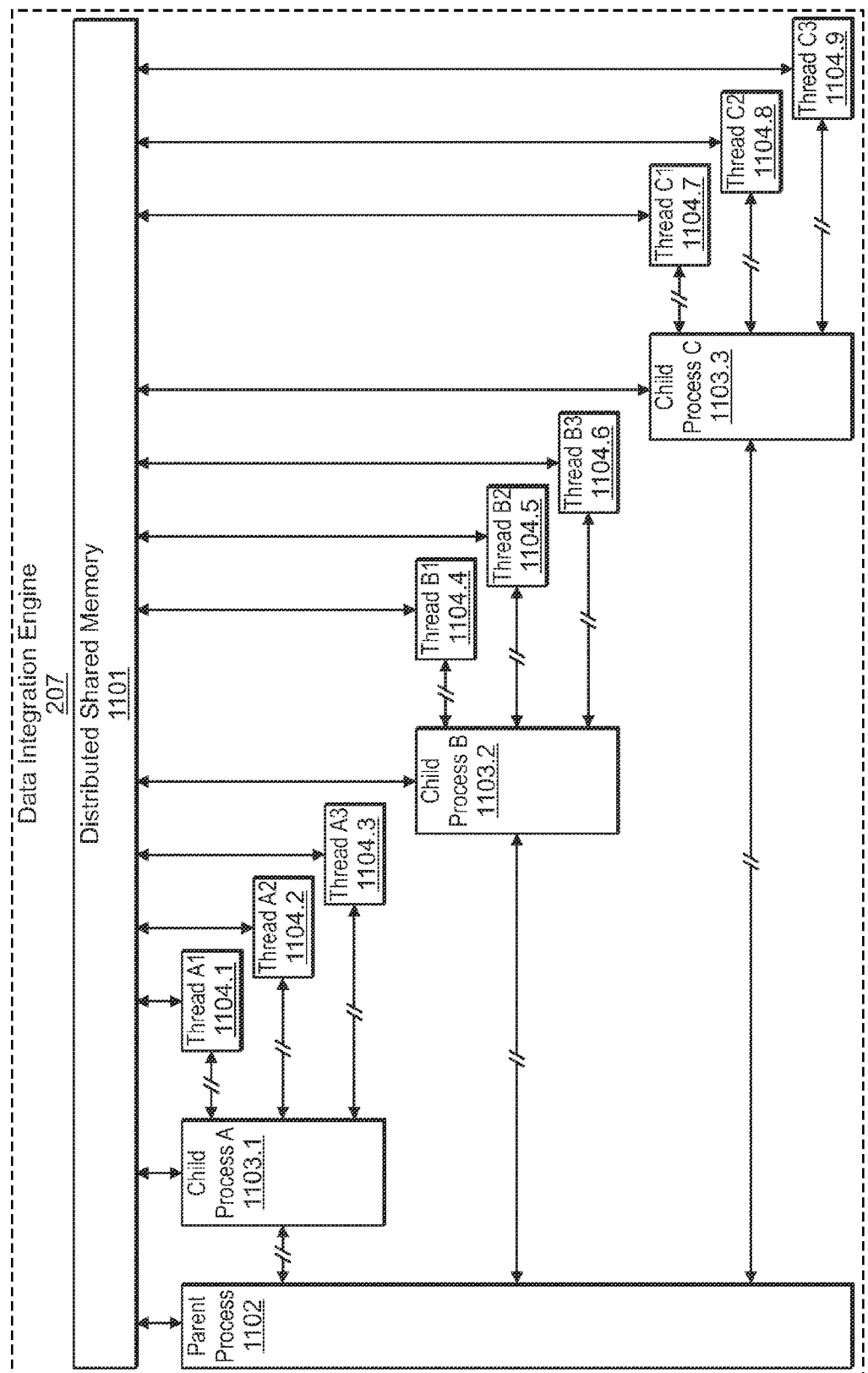
FIG. 11 is a control flow relationship diagram that illustrates control flow within a data integration engine when a sample data integration application is executed on a single host, according to certain embodiments of the invention.

FIG. 11 is a control flow relationship diagram that illustrates the control flow within the data integration engine when the example application 101 is executed on a single host, according to a preferred embodiment. A control flow relationship diagram is a hybrid UML class/activity diagram that conveys the directionality of communication or contact between objects or components. Solid arrows indicate synchronous communication or contact and broken arrows indicate asynchronous communication or contact.

The data integration engine 207 has a single parent process 1102 which is a top-level operating system process whose task is to execute a data integration application defined by artifacts 302 within a specific project 203.1. The data integration engine uses these artifacts (e.g., the application dataflow) to set up, initialize, and perform the data integration.

Distributed shared memory 1101 is a structured area of operating system memory that is used by the parent process 1102 and the child processes 1103.1, 1103.2, 1103.3 running on that host. Each of these child processes is responsible for performing a single function within the application. In the sample application 101, child process A 1103.1 executes to the Read-Data function 102, child process B 1103.2 executes to the Transform-Data function 103, and child process C 1103.3 executes to the Write-Data function 104. Worker threads 1104.1-1104.9 subdivide the processing for each child process.

When the parent process 1102 starts, it analyzes the application dataflow 303 and related metadata in other project artifacts to initialize and run the application. The parent process creates and initializes a shared properties file (not shown) with control flow characteristics for the child processes and threads. The parent process also creates and initializes the distributed shared memory 1101, a section of which is specifically created for and assigned to each child process and thread. Each child process writes information about its execution status to its assigned portion of the distributed shared memory, and this is used by the parent process 1102 to provide updates about the execution status of the data integration engine.

After initialization, the parent process will create each child process 1103.1, 1103.2, 1103.3, synchronously or asynchronously depending on the nature of the function. One child process is created for each function in the dataflow (e.g. Read-Data, Write-Data, and Transform-Data, in the example application 101). When possible, the engine runs each function in parallel so that one function does not need to complete in order for the next to begin.

Upon creation, each child process will read characteristics relevant to its execution from the shared properties file. These characteristics include information about how many threads should be running simultaneously to maximize parallelism. For example, if the shared properties file indicates that there are three different physical data sources for the data read by child process A 1103.1, then child process A will spawn three worker threads 1104.1, 1104.2, 1104.3, each of which loads its data from a different source.

Continuing this example, because child process A is reading data from three sources using three different threads, it has three outputs. So, child process B, which transforms the data read by child process A, has three sources of input. Child process B accordingly spawns three worker threads 1104.4, 1104.5, 1105.6, each thread reading the data output by one of the worker threads spawned by child process A. Finally, child process C, which writes the output of child process B to the specified target, spawns three threads, each of which corresponds to a thread spawned by child process B. This thread system allows the data integration engine to take advantage of the parallelism made possible by multiple data sources.

When a function involves reading from or writing to a data source, the data integration engine examines the application dataflow to determine the type of the data source involved. Based on the type of the data source, the appropriate interface methods are selected, and the data is read or written accordingly.

Control flow is asynchronous and non-locking between parent process, child processes, and threads. This is achieved by combining an update-then-signal asynchronous protocol for all communication (except for communication between threads, described above) and signaler-exclusive distributed shared memory segmentation. Under the update-then-signal protocol, when a parent or child process needs to communicate with its child process or thread, respectively, it may update the distributed shared memory of the child and then asynchronously signal the child. When the child handles the signal, it will read its updated distributed shared memory (if necessary) and react. Communication in the other direction is the same. When a thread or child process needs to communicate with its parent (child process or parent process, respectively), it may first update its distributed shared memory and then asynchronously signal the parent. When the parent handles the signal, it will read the updated distributed shared memory (if necessary) and react. The distributed shared memory areas used for communication are exclusively written by the signaler, ensuring that two processes never attempt to access the same memory simultaneously.

Figure 12:
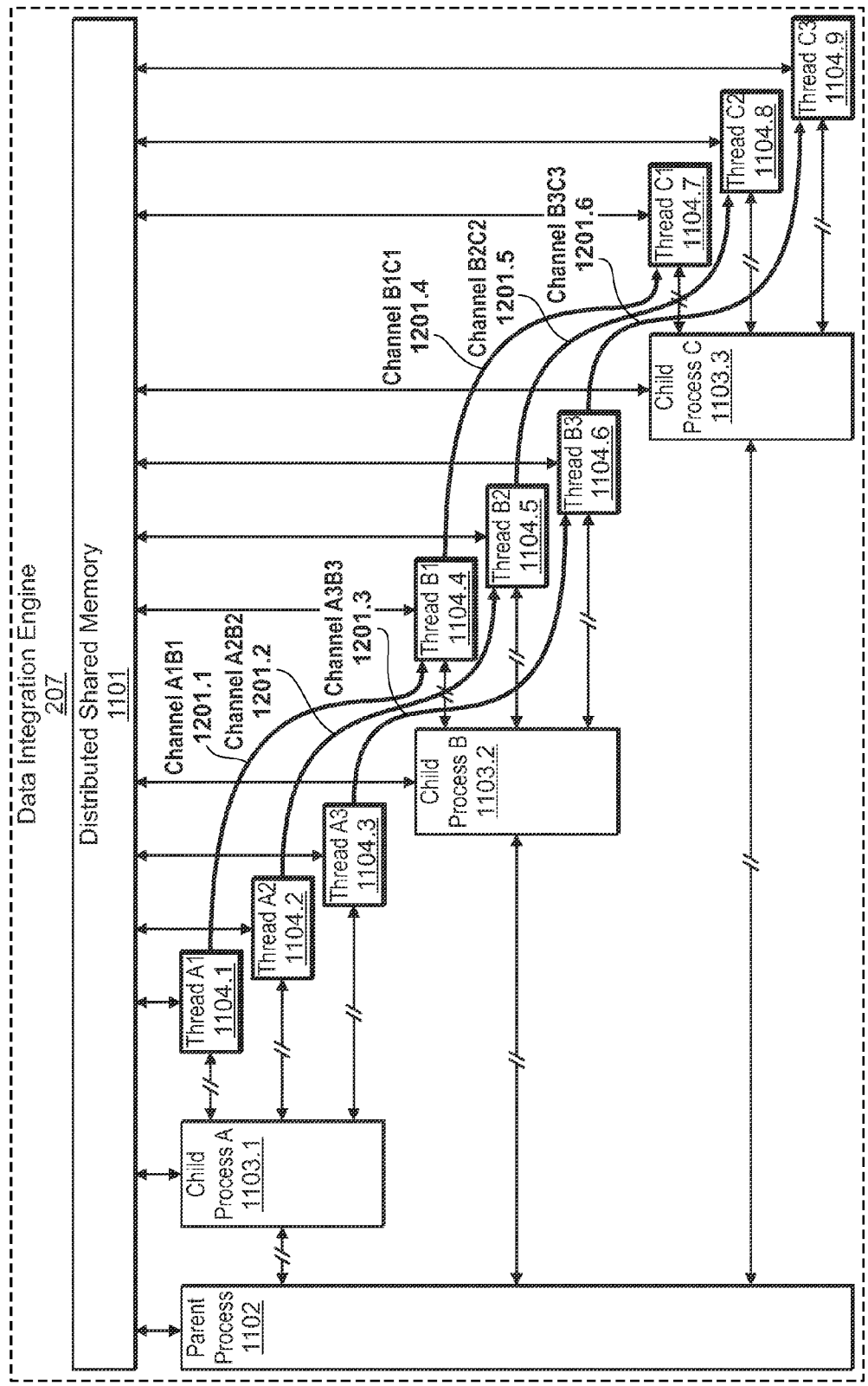
FIG. 12 is a data flow relationship diagram that illustrates the flow of data within a data integration engine when a sample data integration application is executed on a single host, according to certain embodiments of the invention.

FIG. 12 is a data flow relationship diagram that extends FIG. 11 to depict the flow of data within the data integration engine 207 when the example application is executed on a single host. A data flow relationship diagram is an extension of the control flow relationship diagram (as described above) whose purpose is to convey the directionality and flow of data between objects or components. Relevant, previously described, control flow may be shown as muted or grayed, while the objects pertinent to the data flow within that control flow will be prominent or black. The data flow is captured with an arrow indicating the source of the data (no arrow pointer) and the target of the data (arrow pointer) that is optionally labeled with the resource responsible for the data flow.

The only additional annotations in FIG. 12 are channels 1201.1-1201.6 which are resources that are used for passing data from a worker thread for one function to a worker thread for another. Recall from above that the role of child process A 1103.1 is to read data (see the Read-Data function 102 in FIG. 1), the role of child process B 1103.2 is to produce new data by applying transformation logic to that data (see the Transform-Data function 103 in FIG. 1), and the role of child process C 1103.3 is to write the data produced by child process B (see the Write-Data function 104 in FIG. 1). In this model, data flows through a dedicated channel from a worker thread spawned by one child process to a worker thread spawned by another child process. Channels are implemented directly or indirectly through any means of interprocess communication, e.g. named pipes, sockets, riiop, rpc, soap, oob, and mpi.

As described above, each child process subdivides its work using parallel worker threads. In addition, because the characteristics of each function in this example allow for simultaneous processing, child process B 1103.2 does not wait for child process A 1103.1 to read all of the data before it begins; it can start transforming data received from child process A as soon as child process A outputs any data. Similarly, child process C 1103.3 does not wait for child process B to transform all of the data before it begins; it can start writing data received from child process B as soon as child process B outputs any data.

In the application dataflow, each semantic record is associated with a list of Universal Resource Indicators (URIs) that point to the relevant data. These URIs might point to redundant copies of identical data or to data sources containing different data, but all of the indicated data sources must conform to the semantic record format that is specified in the file. Generally, each URI in the list will be unique, allowing the engine to leverage parallelism by reading data simultaneously from several different locations. However, this is not a requirement, and if desired, two or more identical URIs can be listed.

Channel data flow in the sample application is structured as follows: each worker thread on child process A will read data in parallel from a data source specified by one of the listed URIs. As each thread 1104.1, 1104.2, 1104.3 spawned by child process A reads data, it makes that data available as output from child process A to be used as input for child process B 1103.2 by moving the data through a dedicated channel. In this example channel A1B1 1201.1 is a resource that is defined to pass data from thread A1 1104.1 on child process A to thread B1 1104.4 on child process B, channel A2B2 1201.2 passes data from thread A2 1104.2 to thread B2 1104.5, and channel A3B3 1201.3 passes data from thread A3 1104.3 to thread 6 1104.6.

When each worker thread is spawned, it receives information that can be used to identify an input channel and an output channel, using a predetermined channel identification scheme. The thread connects to both of these channels, reads data from the input channel, and writes output data to the output channel. Thus, each thread connects on startup to the appropriate data channels.

Figure 13:
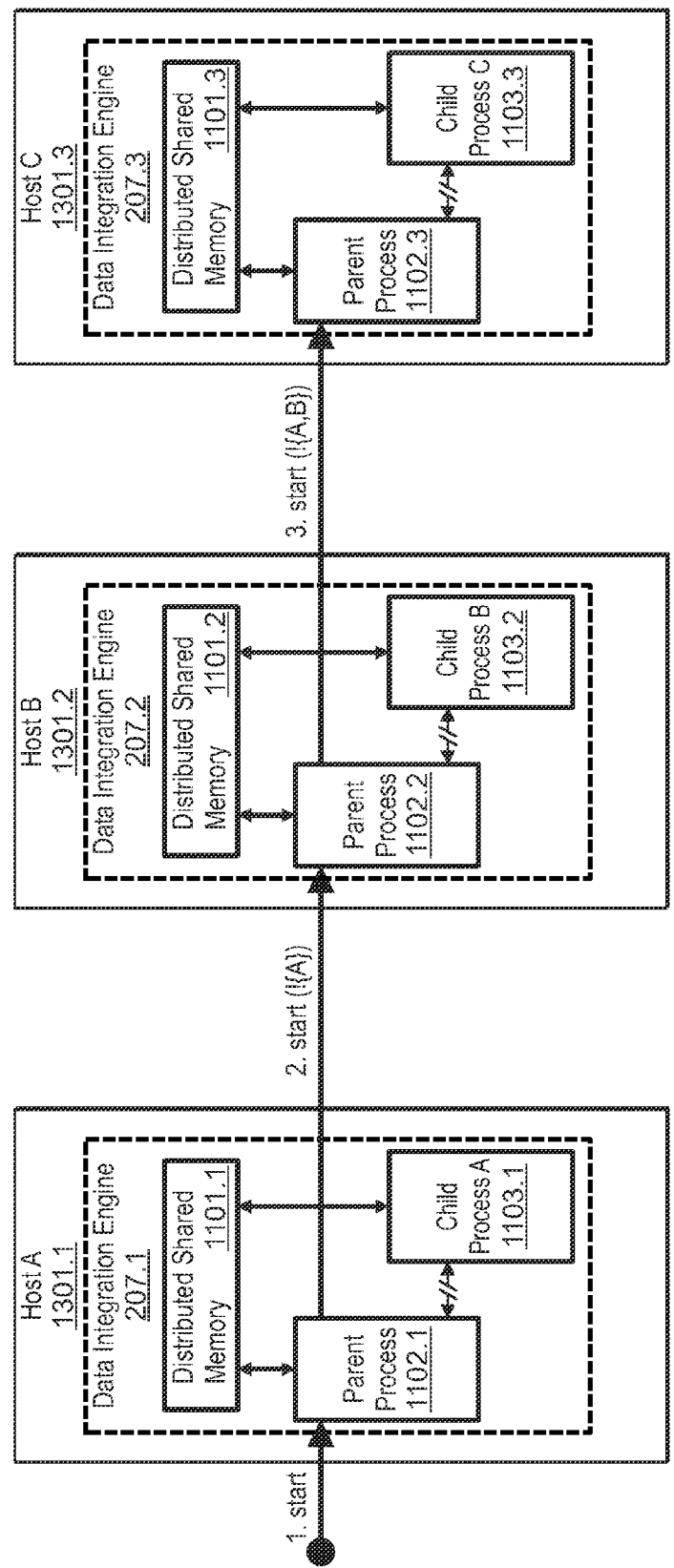
FIG. 13 is a modified UML collaboration diagram that illustrates a startup sequence that results when a sample data integration application is executed in a distributed environment, according to certain embodiments of the invention.

FIG. 13 is a modified UML collaboration diagram that illustrates the startup sequence that results when the sample application is executed in a distributed environment comprising three hosts 1301.1, 1301.2, 1301.3, according to a preferred embodiment. UML collaboration diagrams are used to convey the order of messages passed between object or components. In the collaboration diagrams used here, existing control flow relationships may also be depicted in gray in order to preserve useful context.

The primary difference between this scenario and that depicted in FIG. 11 is that processing will be distributed across 3 hosts 1301.1, 1301.2, 1301.3 in a networked environment. In particular, the first function is specified to run on host A 1301.1, the second function is specified to run on host B 1301.2, and the third function is specified to run on host C 1301.3.

The application is started by executing the data integration engine 207.1 on host A, the "master" host. During the initial setup of the integration engine, the master host reads the application dataflow to determine which application functions will be executed on the master host. Each function is associated with a list of URIs, each of which represents a host on which the function can be executed. For each function, the application developer selects one of the listed hosts from the list, the selection is recorded in the application dataflow, and the corresponding host is used by the data processing engine to execute the function. If no host is specified, the function will execute by default on the same host as the previous function, if possible.

Binary data is passed between hosts using any standardized protocol and byte-order. Preferably, network byte-order is used to transfer binary data between hosts and to temporarily store data on execution hosts. When an operation must be performed that operates on data in machine-native format, the data is automatically converted to machine-native byte-order for the operation, and converted back to the standardized byte-order (e.g., network byte-order) afterwards.

In the particular case of the example application 101, the host A parent process 1102.1 determines that only the Read-Data function will run as a child process on host A. The host A parent process creates a full structure for distributed shared memory 1101.1 but only the sections relevant to child processes that need to run on host A will be initialized, in this case the single child process for the first function. A child process 1103.1 for the Read-Data function is then started on host A in the manner described above. Note that the host A parent process 1102.1, distributed shared memory 1101.1, and child process A 1103.1 are analogous to the parent process 1102, distributed shared memory 1101, and child process A 1103.1 described above in FIG. 11 and FIG. 12.

The host A parent process then starts a new engine parent process 1102.2 on host B, passing input indicating that functions already reserved for host A should be ignored. During initial analysis of the input application, the host B parent process ignores the Read-Data function since it is marked for host A and determines that only the Transform-Data function should run as a child process on host B. As explained above, this choice was optionally made by the developer during the development process and is recorded in the application dataflow artifact.

The host B parent process creates a full structure for distributed shared memory 1101.2 but only the sections relevant to child processes that need to run on host B will be initialized (in this case, the child process for the Transform-Data function). A child process for the Transform-Data function is then started on host B in the manner described above. Note that the host B parent process 1102.2, distributed shared memory 1101.2, and child process B 1103.2 are analogous to the parent process 1102, distributed shared memory 1101, and child process B 1103.2 described above in FIG. 11 and FIG. 12.

The host B parent process then starts a new engine parent process 1102.3 on host C, passing input indicating that functions already reserved for hosts A and B should be ignored. During initial analysis of the input application, the host C parent process ignores the Read-Data and Transform-Data functions because they have been reserved for the other hosts, and determines that only the Write-Data function should run as a child process on host C. As explained above, this choice was optionally made by the developer during the development process and is recorded in the application dataflow artifact.

The host C parent process creates a full structure for distributed shared memory 1101.3 but only the sections relevant to child processes that need to run on host C will be initialized (in this case, the child process for the Write-Data function). A child process for the Write-Data function is then started on host C in the manner described above. Note that the host C parent process 1102.3, distributed shared memory 1101.3, and child process C 1103.3 are analogous to the parent process 1102, distributed shared memory 1101, and child process C 1103.2 described above in FIG. 11 and FIG. 12.

Because there are no more functions to be allocated at this point, the distributed startup sequence is complete.

Figure 14:
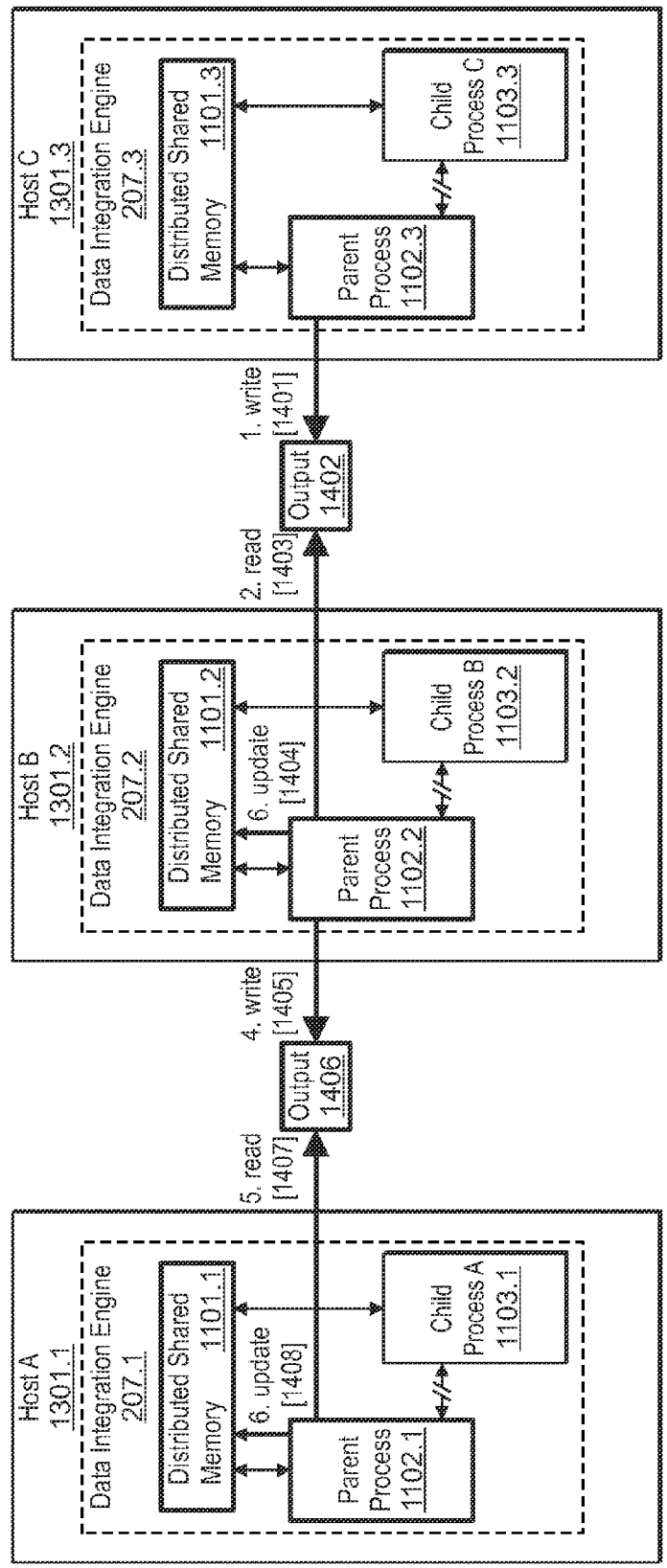
FIG. 14 is a modified UML collaboration diagram that illustrates the process of distributed shared memory replication when a sample data integration application is executed in a distributed environment, according to certain embodiments of the invention.

FIG. 14 is a modified UML collaboration diagram (as described above) that extends FIG. 13 to illustrate the process of distributed shared memory replication when the sample application is executed in a distributed environment comprising three hosts.

In a distributed processing scenario, additional control flow is needed to communicate the status of each host. The parent process 1102.1 on the master host A 1301.1 is responsible for directing the entire application across hosts. As a result of this, its distributed shared memory 1101.1 must reflect the state of all child processes on all child hosts. To do this distributed shared memory is partially replicated from host to host.

Each child process is responsible for updating its portion of the distributed shared memory structure at regular intervals. In the example application, the replication process begins on host C 1301.3 when its update interval arrives. At this point, the parent process 1102.3 writes 1401 its output 1402. When the update interval for host B 1301.2 is reached, the host B parent process 1102.2 will read 1403 the output from the host C parent process, and update 1404 its distributed shared memory 1101.2 with the control data it read as output from host C. A cumulative update of control data including control data from host B and host C is then written 1405 as output 1406 from the parent process. When the update interval for host A is reached, the host A parent process 1102.1 will read 1407 the output from the host B parent process (which it started), and update 1408 its own host A distributed shared memory 1101.1 with the control data it read as output from host B.

The parent process on the master host periodically reads the contents of the distributed shared memory to obtain information related to each of the child processes. This process occurs at regular intervals, and is timed according to a user-configurable parameter. The information read from the distributed shared memory is used to monitor the progress of the child processes and to provide status updates. Using a distributed shared memory structure to provide status updates allows the child processes to process data in an uninterrupted fashion, without pausing periodically to send status messages. Essentially, this creates a system by which data are transferred from child process to child process "in-band" while status messages and updates are transferred "out-of-band," separate from the flow of data.

Figure 15:
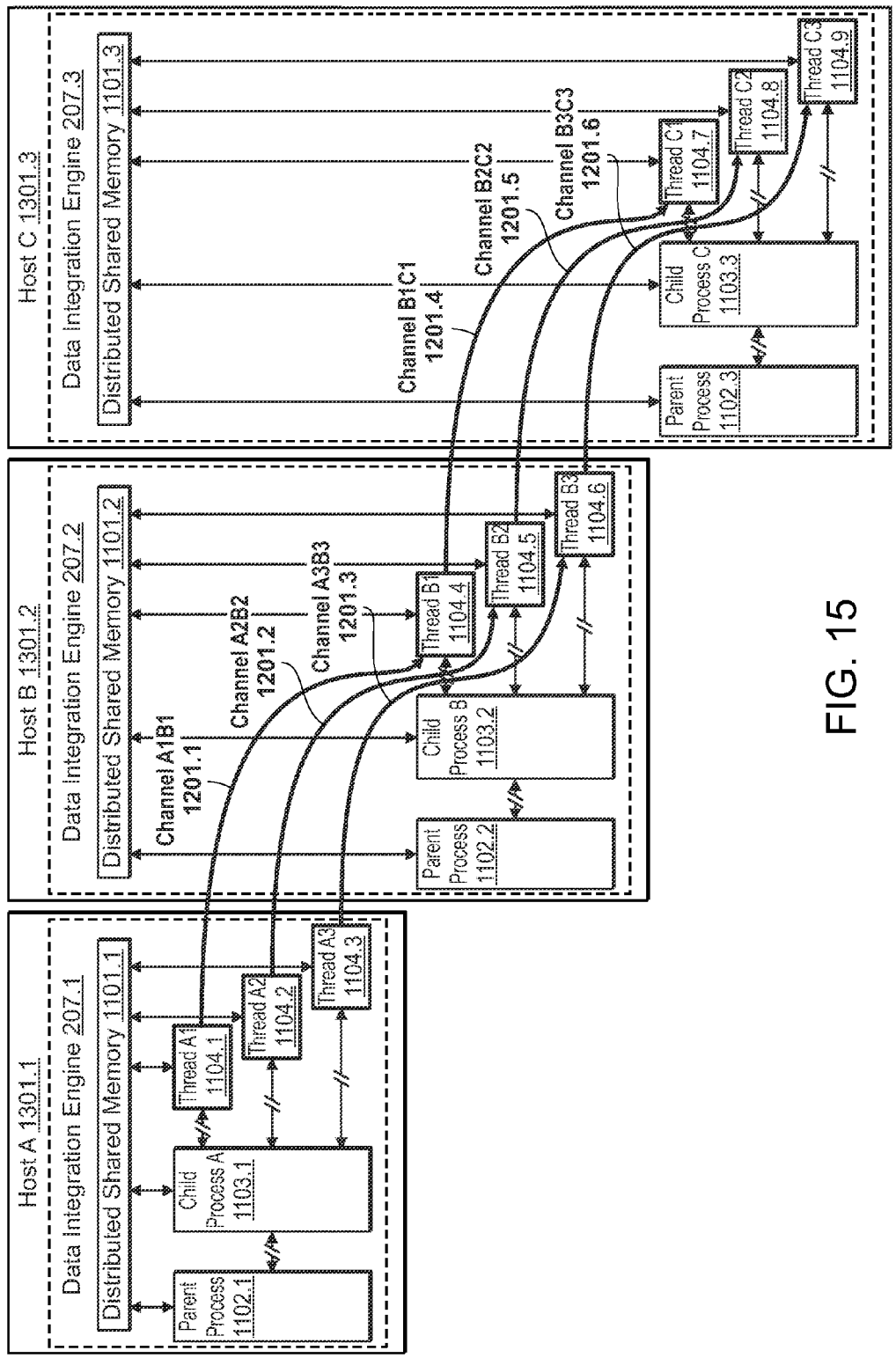
FIG. 15 is a data flow relationship diagram that illustrates the flow of data in a data integration engine when a sample data integration application is run in a distributed environment, according to certain embodiments of the invention.

FIG. 15 is a data flow relationship diagram (as described above) that merges FIG. 12 and FIG. 13 to illustrate the flow of data in the data integration engine when the sample application is run in a distributed environment comprising three hosts. The channel data flow method being employed is identical to the single-host/single-instance method described above with reference to FIG. 12, except that the channels now operate to pass data between threads running on different hosts. The communication channels that pass data between threads across hosts can be implemented using any inter-host communication means, including sockets, riiop, rpc, soap, oob, and mpi.

It will be appreciated that the scope of the present invention is not limited to the above-described embodiments, but rather is defined by the appended claims; and that these claims will encompass modifications of and improvements to what has been described.

What is claimed is:

1. A method of developing a data integration application that receives, transforms, and outputs data by using semantic data types to define and process application data used internally by the application, the method comprising:
   a. defining an input schema that describes the structure and type of input data;
   b. defining an output schema that describes the structure and type of output data;
   c. defining a set of semantic data types, wherein the semantic data types are to be used internally by the data integration application to represent application data;
   d. creating input mapping specifications based on the input schema and the set of semantic data types, wherein each input mapping specification maps input data having an input data type to application data having a first semantic data type of the set of semantic data types corresponding to said input data type;
   e. creating output mapping specifications based on the output schema and the set of semantic data types, wherein each output mapping specification maps application data having a second semantic data type of the set of semantic data types to output data having an output data type corresponding to said second semantic data type;
   f. defining, using a computing device, a set of input functions, each input function used for receiving input data and converting, according to the input mapping specifications, the received input data into application data having one or more semantic data types;
   g. defining, using the computing device, a set of transform functions, each transform function used for receiving application data and producing transformed application data, wherein the received application data and the transformed application data have one or more semantic data types;
   h. defining, using the computing device, a set of output functions, each output function used for receiving application data having one or more semantic data types, and converting, according to the output mapping specifications, the received application data into output data; and
   i. creating, using the computing device, a data flow that uses the set of semantic data types, the set of input functions, the set of transform functions, and the set of output functions to specify the desired behavior of the data integration application.

2. A method of creating a data integration template that can be used to develop multiple data integration applications having various input data sources and output data sources, wherein said data integration template uses semantic data types to specify the desired transformation of application data within said multiple data integration applications, the method comprising:
   a. defining an input schema that describes the structure and type of input data;
   b. defining an output schema that describes the structure and type of output data;
   c. defining, using a computing device, a set of semantic data types, wherein the semantic data types are to be used internally by one or more data integration applications to represent application data;
   d. creating input mapping specifications based on the input schema and the set of semantic data types, wherein each input mapping specification maps input data having an input data type to application data having a first semantic data type of the set of semantic data types corresponding to said input data type;
   e. creating output mapping specifications based on the output schema and the set of semantic data types, wherein each output mapping specification maps application data having a second semantic data type of the set of semantic data types to output data having an output data type corresponding to said second semantic data type;
   f. defining, using the computing device, a set of transform functions, each transform function used for receiving application data and producing transformed application data, wherein the received application data and the transformed application data have one or more semantic data types; and
   g. creating, using the computing device, a data flow that uses the set of semantic data types and the set of transform functions to specify a desired transformation logic.

3. A system for developing a data integration application that receives, transforms, and outputs data by using semantic data types to define and process application data used internally by the application, the system comprising a computing device configured to:
   a. define an input schema that describes the structure and type of input data;
   b. define an output schema that describes the structure and type of output data;
   c. define a set of semantic data types, wherein the semantic data types are to be used internally by the data integration application to represent application data;
   d. create input mapping specifications based on the input schema and the set of semantic data types, wherein each input mapping specification maps input data having an input data type to application data having a first semantic data type corresponding to said input data type;
   e. create output mapping specifications based on the output schema and the set of semantic data types, wherein each output mapping specification maps application data having a second semantic data type to output data having an output data type corresponding to said second semantic data type;
   f. define a set of input functions, each input function used for receiving input data and converting, according to the input mapping specifications, the received input data into application data having one or more semantic data types;
   g. define a set of transform functions, each transform function used for receiving application data and producing transformed application data, wherein the received application data and the transformed application data have one or more semantic data types;

h. define a set of output functions, each output function used for receiving application data having one or more semantic data types, and converting, according to the output mapping specifications, the received application data into output data; and i. create a data flow that uses the set of semantic data types, the set of input functions, the set of transform functions, and the set of output functions to specify the desired behavior of the data integration application.

4. A system for creating a data integration template that can be used to develop multiple data integration applications having various input data sources and output data sources, wherein said data integration template uses semantic data types to specify the desired transformation of application data within said multiple data integration applications, the system comprising a computing device configured to:

a. defining an input schema that describes the structure and type of input data;

b. defining an output schema that describes the structure and type of output data;

c. define a set of semantic data types, wherein the semantic data types are to be used internally by one or more data integration applications to represent application data;

d. creating input mapping specifications based on the input schema and the set of semantic data types, wherein each input mapping specification maps input data having an input data type to application data having a first semantic data type of the set of semantic data types corresponding to said input data type;

e. creating output mapping specifications based on the output schema and the set of semantic data types, wherein each output mapping specification maps application data having a second semantic data type of the set of semantic data types to output data having an output data type corresponding to said second semantic data type;

f. define a set of transform functions, each transform function used for receiving application data and producing transformed application data, wherein the received application data and the transformed application data have one or more semantic data types; and g. create a data flow that uses the set of semantic data types and the set of transform functions to specify a desired transformation logic.

* * * * *